(12) United States Patent
Li

(10) Patent No.: US 12,511,798 B2
(45) Date of Patent: Dec. 30, 2025

(54) IMAGE DISPLAY METHOD, DISPLAY DEVICE AND VEHICLE

(71) Applicants: Chongqing BOE Display Technology Co., Ltd., Chongqing (CN); BOE TECHNOLOGY GROUP CO., LTD., Beijing (CN)

(72) Inventor: Xiaogang Li, Beijing (CN)

(73) Assignees: CHONGQING BOE DISPLAY TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 267 days.

(21) Appl. No.: 18/252,956

(22) PCT Filed: Mar. 28, 2022

(86) PCT No.: PCT/CN2022/083490
§ 371 (c)(1),
(2) Date: May 15, 2023

(87) PCT Pub. No.: WO2023/184113
PCT Pub. Date: Oct. 5, 2023

(65) Prior Publication Data
US 2024/0346711 A1  Oct. 17, 2024

(51) Int. Cl.
*G06T 11/00* (2006.01)
*G09G 3/20* (2006.01)
(Continued)

(52) U.S. Cl.
CPC .......... *G06T 11/001* (2013.01); *G09G 3/2096* (2013.01); *G09G 2320/0666* (2013.01); *G09G 2340/045* (2013.01); *G09G 2380/10* (2013.01)

(58) Field of Classification Search
CPC ................ G06T 11/001; G09G 3/2096; G09G 2320/2096; G09G 2320/0666; G09G 2340/045; G09G 2380/10; G09G 5/02; G09G 3/20; G09G 3/3208; G09G 3/3413; G09G 3/3607; G09G 3/2051; G09G 3/2003; G09G 2320/069; G09G 2320/066;
(Continued)

(56) References Cited

U.S. PATENT DOCUMENTS

| 6,804,403 B1 * | 10/2004 | Wang ..................... H04N 19/63 |
| | | 375/E7.056 |
| 2009/0033675 A1 * | 2/2009 | Hunt ........................ G09G 3/20 |
| | | 345/589 |

(Continued)

FOREIGN PATENT DOCUMENTS

| CN | 1985291 A | 6/2007 |
| CN | 101668107 A | 3/2010 |

(Continued)

*Primary Examiner* — Wesner Sajous
(74) *Attorney, Agent, or Firm* — XSENSUS LLP

(57) ABSTRACT

An image display method includes: obtaining both an original image and a color rendering parameter corresponding to an image to be displayed, a bit number of color depth of the original image being smaller than a bit number of color depth of the image to be displayed; generating the image to be displayed according to the original image and the color rendering parameter; and displaying the image to be displayed.

14 Claims, 10 Drawing Sheets

(51) Int. Cl.
*G09G 5/02* (2006.01)
*H04N 1/60* (2006.01)

(58) Field of Classification Search
CPC ......... G09G 2320/0613; H04N 1/6058; H04N 9/64–73; H04N 9/77; H04N 5/445; H04N 5/57–58; H04N 1/60
See application file for complete search history.

(56) References Cited

U.S. PATENT DOCUMENTS

| | | | |
|---|---|---|---|
| 2009/0066840 A1* | 3/2009 | Karlov | H04N 19/61 |
| | | | 348/E9.037 |
| 2014/0010282 A1 | 1/2014 | He et al. | |
| 2016/0239607 A1* | 8/2016 | Guillama | G16H 10/60 |
| 2023/0087480 A1* | 3/2023 | Ryu | H03M 1/1019 |
| | | | 345/204 |

FOREIGN PATENT DOCUMENTS

| | | | | |
|---|---|---|---|---|
| CN | 108614633 A | | 10/2018 | |
| CN | 110458921 A | | 11/2019 | |
| CN | 110928695 A | | 3/2020 | |
| CN | 111913193 A | | 11/2020 | |
| CN | 112114965 A | | 12/2020 | |
| CN | 112199618 A | | 1/2021 | |
| CN | 202010329096 A | * | 10/2021 | ............. G08G 1/217 |

\* cited by examiner

IMAGE DISPLAY METHOD, DISPLAY DEVICE AND VEHICLE

CROSS-REFERENCE TO RELATED APPLICATION

This application is a national phase entry under 35 USC 371 of International Patent Application No. PCT/CN2022/083490, filed on Mar. 28, 2022, which is incorporated herein by reference in its entirety.

TECHNICAL FIELD

The present disclosure relates to the field of display technology, and in particular, to an image display method, a display device, and a vehicle.

BACKGROUND

During normal driving of a vehicle, a vehicle dashboard may display various types of vehicle condition information (such as vehicle speed, fuel quantity, water temperature, electric quantity) of the vehicle on display screen of the dashboard according to signals transmitted from a graphics processing unit (GPU), so that the driver may make safe driving behaviors based on the vehicle condition information.

SUMMARY

In an aspect, an image display method is provided. The image display method includes: obtaining both an original image and a color rendering parameter corresponding to an image to be displayed, a bit number of color depth of the original image being smaller than a bit number of color depth of the image to be displayed; generating the image to be displayed according to the original image and the color rendering parameter; and displaying the image to be displayed.

In some embodiments, the original image includes a background portion and an icon portion, a color of the background portion is a first color, and a color of the icon portion is a second color. Generating the image to be displayed according to the original image and the color rendering parameter, includes: adjusting the color of the icon portion in the original image from the second color to a third color according to the color rendering parameter, so as to obtain the image to be displayed.

In some embodiments, obtaining both the original image and the color rendering parameter corresponding to the image to be displayed, includes: obtaining both a first index value and a second index value of the image to be displayed; searching and obtaining the original image from a preset mapping relationship according to the first index value of the image to be displayed; and searching and obtaining the color rendering parameter from the preset mapping relationship according to the second index value of the image to be displayed. The preset mapping relationship includes a corresponding relationship between the first index value of the image to be displayed and the original image, and a corresponding relationship between the second index value of the image to be displayed and the color rendering parameter.

In some embodiments, the bit number of color depth of the image to be displayed is 24 bits, and the bit number of color depth of the original image is 1 bit.

In some embodiments, the image display method further includes: obtaining a size adjustment parameter of the image to be displayed. Generating the image to be displayed according to the original image and the color rendering parameter, includes: generating the image to be displayed according to the original image, the color rendering parameter, and the size adjustment parameter.

In some embodiments, the size adjustment parameter includes a size magnification factor. Generating the image to be displayed according to the original image, the color rendering parameter, and the size adjustment parameter, includes: enlarging the original image according to the size magnification factor, so as to obtain an enlarged original image; and performing color rendering processing on the enlarged original image according to the color rendering parameter, so as to obtain the image to be displayed. Alternatively, generating the image to be displayed according to the original image, the color rendering parameter, and the size adjustment parameter, includes: performing color rendering processing on the original image according to the color rendering parameter, so as to obtain a color-rendered original image; and enlarging the color-rendered original image according to the size magnification factor, so as to obtain the image to be displayed.

In another aspect, a display device is provided. The display device is used to realize the image display method according to any of the above embodiments. The display device includes a timing controller, and a storage medium and a display screen that are coupled with the timing controller. The storage medium is configured to store the original image and the color rendering parameter. The timing controller is configured to obtain both the original image and the color rendering parameter corresponding to the image to be displayed from the storage medium, and generate data of the image to be displayed according to the original image and the color rendering parameter. The display screen is configured to display the image to be displayed according to the data of the image to be displayed generated by the timing controller. The bit number of color depth of the original image is smaller than the bit number of color depth of the image to be displayed.

In some embodiments, the display device further includes a micro controller unit coupled to the timing controller. The micro controller unit is configured to send an instruction for obtaining the image to be displayed to the timing controller, and the instruction includes both a first index value and a second index value of the image to be displayed. The storage medium stores a preset mapping relationship therein, and the preset mapping relationship includes a corresponding relationship between the first index value of the image to be displayed and the original image, and a corresponding relationship between the second index value of the image to be displayed and the color rendering parameter. The timing controller is further configured to obtain both the first index value and the second index value of the image to be displayed; search and obtain the original image from the preset mapping relationship in the storage medium according to the first index value of the image to be displayed; and search and obtain the color rendering parameter from the preset mapping relationship in the storage medium according to the second index value of the image to be displayed.

In some embodiments, the instruction further includes a size adjustment parameter. The timing controller is further configured to generate the image to be displayed according to the original image, the color rendering parameter, and the size adjustment parameter.

In some embodiments, the timing controller includes an integrated circuit. The integrated circuit is coupled to the storage medium, and the integrated circuit is configured to store the original image and the color rendering parameter that are obtained from the storage medium.

In some embodiments, the original image includes a background portion and an icon portion, a color of the background portion is a first color, and a color of the icon portion is a second color. The timing controller further includes an image processing unit coupled to the integrated circuit. The image processing unit is configured to adjust a color of the icon portion of the original image stored in the integrated circuit from the second color to a third color according to the color rendering parameter stored in the integrated circuit, so as to obtain the image to be displayed.

In some embodiments, the display device further includes a source driver. The source driver is coupled to the timing controller and coupled to the display screen. The source driver is configured to receive the data of the image to be displayed generated by the timing controller, generate a driving signal according to the data of the image to be displayed, and drive the display screen to display the image to be displayed.

In some embodiments, communication protocol between the timing controller and the micro controller unit includes a serial peripheral interface (SPI) communication protocol or an inter-integrated circuit (I2C) protocol, and communication protocol between the integrated circuit and the storage medium includes the SPI communication protocol or the I2C protocol.

In another aspect, a vehicle is provided. The vehicle includes the display device according to any of the above embodiments.

In some embodiments, the vehicle further includes a monitoring system. The monitoring system is configured to obtain monitoring information of the vehicle. The monitoring information corresponds to the image to be displayed. The display device includes a micro controller unit and a timing controller that are coupled to each other. The micro controller unit is further coupled to the monitoring system. The micro controller unit is configured to generate an instruction for obtaining the image to be displayed according to the monitoring information of the vehicle, and transmit the instruction to the timing controller.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, but are not limitations on an actual size of a product to which the embodiments of the present disclosure relate.

DETAILED DESCRIPTION

Figure 1:
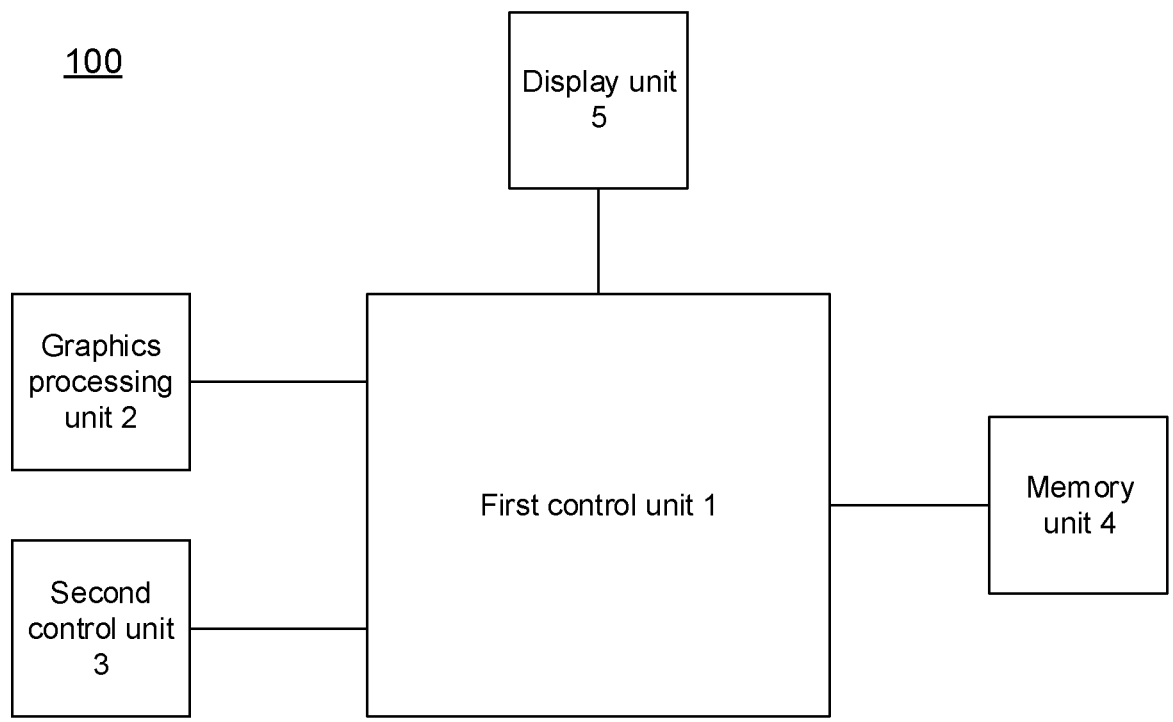
FIG. 1 is a structural diagram of an image display system, in accordance with some embodiments of the present disclosure.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined with "first" or "second" may explicitly or implicitly include one or more of the features. In the description of the embodiments of the present disclosure, term "a plurality of" or "the plurality of" means two or more unless otherwise specified.

In the description of some embodiments, the expressions "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "applicable to" or "configured to" as used herein indicates an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

The term "about" or "substantially" or "approximately" as used herein includes a stated value and an average value within an acceptable range of deviation of a particular value. The acceptable range of deviation is determined by a person of ordinary skill in the art in consideration of the measurement in question and errors associated with the measurement of a particular quantity (i.e., limitations of the measurement system).

Exemplary embodiments are described herein with reference to sectional views and/or plan views as idealized exemplary drawings. In the accompanying drawings, thicknesses of layers and sizes of regions are enlarged for clarity. Variations in shapes relative to the accompanying drawings due to, for example, manufacturing technologies and/or tolerances may be envisaged. Therefore, the exemplary embodiments should not be construed to be limited to the shapes of regions shown herein, but to include deviations in the shapes due to, for example, manufacturing. For example, an etched region shown in a rectangular shape generally has a feature of being curved. Therefore, the regions shown in the accompanying drawings are schematic in nature, and their shapes are not intended to show actual shapes of the regions in a device, and are not intended to limit the scope of the exemplary embodiments.

Under normal conditions, the vehicle dashboard may display images according to information sent by a graphics processing unit. However, in a case where a system fault such as an abnormality of the host system or an abnormality of the signal transmission system occurs, the graphics processing unit may not transmit a signal to the dashboard normally, so that the display screen of the dashboard has problems such as abnormal display or non-display. As a result, the driver cannot know the vehicle condition information of the vehicle in time, which is easy to cause the driver to be unable to make subjective judgments on the vehicle condition, resulting in unsafe driving problems.

An on screen display (OSD) is an image display method that can be applied to a display device, which may display some special glyphs or graphics (e.g., an ICON icon) in a display device. A user may obtain corresponding information according to these special glyphs or graphics. For example, the OSD may be applied to a vehicle, and in the case where the display screen of the dashboard has problems such as abnormal display or non-display, the dashboard may read an image from a storage medium and transmit the image to the display screen of the dashboard, so that the image corresponding to the vehicle condition information may be displayed on the display screen of the dashboard. Therefore, it may help the driver make subjective judgments in time and make the safe driving behaviors, thereby avoiding unsafe driving problems.

In the related art, when the OSD function is applied, whether an image stored in another storage medium or an image temporarily stored in a storage medium of an integrated circuit (IC) of the dashboard during transmission, the bit number of color depth of the image is relatively large, and correspondingly, the memory occupied by the image is relatively large. In this way, in a case where there are a plurality of types and numbers of images required, it is easy to cause image information composed of a plurality of images to occupy a large amount of memory space in the storage medium, thereby increasing costs, thereby increasing the cost.

In view of this, embodiments of the present disclosure provide an image display method, in which an original image with the lower bit number of color depth is used in a process of storing and transmitting the image, and then color rendering processing is performed on the original image to generate an image to be displayed with the higher bit number of color depth than the bit number of color depth the original image, so as to display the image with the higher bit number of color depth. In this way, the memory space occupied by the image information in the storage medium may be reduced, so that a storage medium with a small total storage space may be used, and thus the cost may be reduced.

In addition, in a case of storing images of the same type and the same number, since the image information in the related art occupies the relatively large space in the storage medium of the IC, and correspondingly, the storage medium of the IC requires a relatively complex circuit structure, which may increase the encapsulating difficulty of the IC. In the image display method provided by the embodiments of the present disclosure, since the image information occupies the relatively small memory space in the storage medium of the IC, and correspondingly, the storage medium of the IC requires a relatively simple circuit structure. Thus, the encapsulating difficulty of the IC may be reduced.

The embodiments of the present disclosure provide a schematic diagram of an image display system. As shown in FIG. 1, the image display system 100 includes a first control unit 1, and a graphics processing unit 2, a second control unit 3, a memory unit 4 and a display unit 5 that are coupled to the first control unit 1.

In an example situation, the first control unit 1 may continuously receive image information transmitted by the graphics processing unit 2, and generate a corresponding first control signal according to the image information. The display unit 5 may drive the display unit 5 to generate a display image under control of the first control signal.

In another example situation, the first control unit 1 may not receive the image information transmitted by the graphics processing unit 2. When detecting e abnormal transmission, the first control unit 1 may send a feedback signal to the second control unit 3. After receiving the feedback signal, the second control unit 3 sends an instruction to the first control unit 1 to make the first control unit 1 enter the OSD mode. In the OSD mode, the first control unit 1 may read a pre-stored special glyph or graphic (e.g., an ICON icon) from the memory unit 4 according to the instruction sent by the second control unit 3, and then transmit the special glyph or graphic (e.g., the ICON icon) to the display unit 5, so that the display unit 5 may display the special glyph or graphic, thereby enabling the user to obtain corresponding information from the special glyph or graphic. The image display method provided by the embodiments of the present disclosure may be applied to scenarios used for helping the user obtain valid information according to the image, such as a vehicle assists driving or a road passing indication, which is not limited here.

The image display method provided by the present disclosure is described below by considering an example in which the image display method is applied to a vehicle assisted driving scenario. The image display method provided by the present disclosure may be applied to the image display system.

Figure 2:
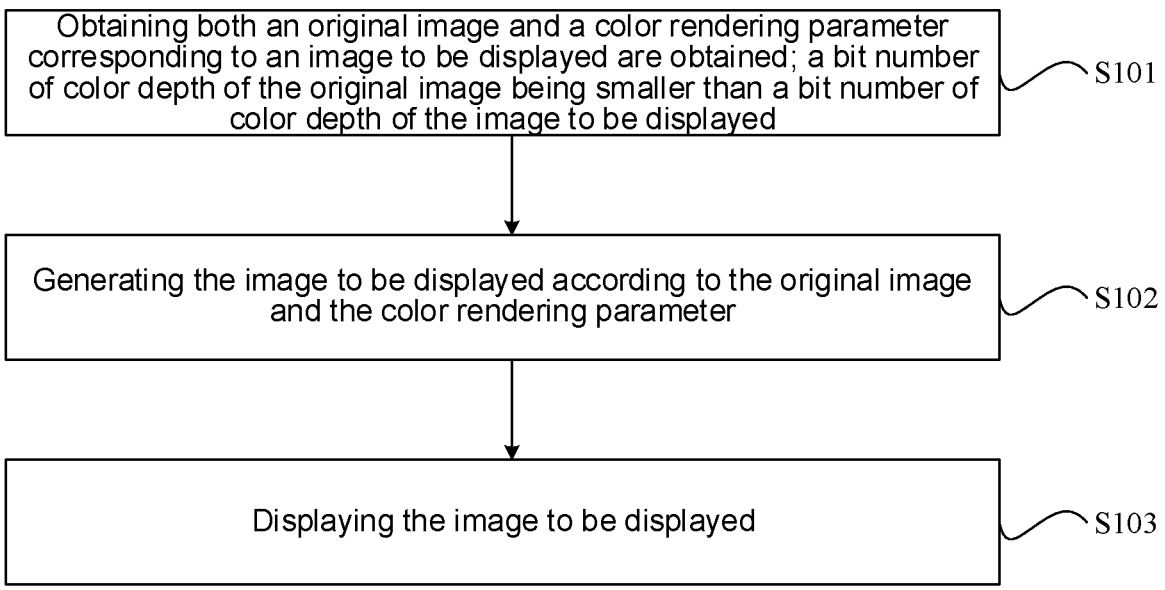
FIG. 2 is a flowchart of an image display method, in accordance with some embodiments of the present disclosure.

In some embodiments, as shown in FIG. 2, an image display method is provided, and the method includes S101 to S103.

In S101, both an original image and a color rendering parameter corresponding to an image to be displayed are obtained.

In some examples, the image to be displayed may include at least one icon, and an icon may be used to represent a type of vehicle condition information of the vehicle.

For example, the icon may be an ICON icon. The ICON icon refers to an icon in an ICON format, and may be used as a graphic mark for identifying specific information. The user may learn about the vehicle condition information of the vehicle according to the graphic mark and/or color reflected by the ICON icon.

For example, the image to be displayed includes an icon of the fuel quantity. The user may determine whether the vehicle is in a low fuel quantity state in combination with petrol station graphics included in the icon of the fuel quantity and colors of the graphics. In this way, during the driving, the user watches the icon of the fuel quantity in the image to be displayed, and may go to the nearest petrol station in time to refuel in a case of knowing that the vehicle is in the low fuel quantity state.

For example, the image to be displayed includes an icon of water temperature. The user may determine whether the water temperature of the vehicle is in an abnormal state in combination with a thermometer graphic included in the icon of water temperature and a color of the graphic. In this way, during the driving, the user watches the icon of water temperature in the image to be displayed, and may pull over and park in time to check the vehicle condition in a case of knowing that the vehicle is in a high water temperature state, so as to avoid danger.

For example, the image to be displayed includes an icon of electric quantity. The user may determine whether the vehicle is in a low electric quantity state in combination with a battery graphic included in the icon of electric quantity and a color of the graphic. In this way, during the driving, the user watches the icon of electric quantity in the image to be displayed, and may re-plan the trip in time in a case of knowing that the vehicle is already in the low electric quantity state.

For example, the image to be displayed may include a plurality of icons, and the plurality of icons may include icons for representing the fuel quantity, the water temperature, the electric quantity, a safety belt prompt, a door prompt, etc. In this way, the user can master the vehicle condition information relatively completely, so as to help the user make correct judgments according to the comprehensive vehicle condition information, thereby avoiding dangerous driving behaviors.

In some embodiments, in a case where the image to be displayed includes the plurality of icons, the graphic marks of the plurality of icons may be set according to actual needs, and the arrangement positions of the plurality of icons in the image to be displayed may also be set according to actual needs, which are not limited here. In some examples, the graphic marks of the icons included in the original image are the same as the graphic marks of the icons included in the image to be displayed. That is, the original image and the image to be displayed may reflect the same types of the vehicle condition information.

For example, in a case where the original image includes icons for representing the fuel quantity, the water temperature, and the electric quantity, the image to be displayed also includes icons for representing the fuel quantity, the water temperature, and the electric quantity.

In some examples, the bit number of color depth of the original image is smaller than the bit number of color depth of the image to be displayed.

It will be noted that the bit number of color depth of the image is the bit number required for storing the color of 1 pixel in the bitmap or the video frame buffer in the computer graphics field. The larger the bit number of color depth, the more the colors of the image capable of being exhibited, and the larger the memory space required for the image. For example, the bit number of color depth of the image is 1 bit, which indicates that the image may at most exhibit $2^1$ colors, that is, two colors of black and white. For example, the bit number of color depth of the image is 2 bits, which indicates that the image may at most exhibit $2^2$ colors, that is, four colors. For example, the bit number of color depth of the image is 16 bits, which indicates that red color R in the three primary colors may be divided into $2^5$ (i.e., 32) gray scales, blue color B in the three primary colors may be divided into $2^5$ (i.e., 32) gray scales, green color G in the three primary colors may be divided into $2^6$ (i.e., 64) gray scales, and correspondingly, the image may exhibit $2^{16}$ (i.e., 32768) colors totally. For example, the bit number of color depth of the image is 24 bits, which indicates that the color red R in the three primary colors may be divided into $2^8$ (i.e., 256) gray scales, the blue color B in the three primary colors may be divided into $2^8$ (i.e., 256) gray scales, the green color G in the three primary colors may be divided into $2^8$ (i.e., 256) gray scales, and correspondingly, the image may exhibit $2^{24}$ (i.e., 16777216) colors totally.

For example, the bit number of color depth of the original image may be 1 bit, 2 bits, or 16 bits.

For example, the bit number of color depth of the image to be displayed may be 2 bits, 4 bits, 16 bits, or 24 bits.

For example, the bit number of color depth of the image to be displayed is 24 bits, and the bit number of color depth of the original image is 1 bit. That is, the original image may at most have $2^1$ (i.e., 2) colors, where red information, green information, and blue information that correspond to the original image respectively occupy 1 bit of memory space. The image to be displayed may at most have $2^{24}$ (i.e., 16777216) colors, where red information, green information and blue information that correspond to the image to be displayed respectively occupy 8 bits of memory space.

The sizes of the storage spaces required to be occupied by using the image display method in the related art and the image display method in the embodiments of the present disclosure are described by considering an example in which there are 80 icons stored in the storage medium and each icon has a pixel size of 128×128.

The above 128×128 indicates that each icon includes 128 rows of pixels, and each row of pixels includes 128 pixels. Therefore, the total number of pixels included in each icon is 128×128=16384.

In a case where the image display method in the related art is adopted, the size of the storage space required to be occupied is 128×128×3×8×80=31457280 bits, which is equal to 30 megabytes.

In a case where the image display method provided in the present embodiments is adopted, the size of the storage space required to be occupied is 128×128×3×1×80=3932160 bits, which is equal to 3.75 megabytes.

Therefore, in a case where the original image with the bit number of color depth of 1 bit is used in the storage and transmission process, compared with the image to be displayed with the bit number of color depth of 24 bits is directly used in the storage and transmission process in the related art, the memory space required in the storage medium may be effectively reduced.

Thus, the image display method in the present examples adopt the original image with a small bit number of color depth in the storage and transmission process, so that the memory space required for storing the original image is smaller than the memory space required for directly storing the image to be displayed, and the storage medium with a small total storage space may be used. Compared with the related art, the cost may be reduced. Moreover, since the memory space occupied by the original image is small, the speed of reading the original image is relatively fast, which may be beneficial to accelerating the response speed of image display.

In some examples, there are a plurality of color rendering parameters, and each color rendering parameter corresponds to a color.

It will be noted that the color corresponding to the color rendering parameter may be set according to actual needs, which is not limited in the present disclosure.

For example, a color rendering parameter Red corresponds to the red color, a color rendering parameter Green corresponds to the green color, a color rendering parameter Blue corresponds to the blue color, and a color rendering parameter Gray corresponds to a gray color.

For example, in the case where the image to be displayed includes the plurality of icons, two color rendering parameters corresponding to any two icons may be the same color rendering parameters, or may be different color rendering parameters.

For example, the image to be displayed includes an icon of fuel quantity, an icon of electric quantity, and an icon of water temperature.

Then, the icon of fuel quantity and the icon of electric quantity may correspond to the same color rendering parameters, that is, the icon of fuel quantity and the icon of electric quantity in the image to be displayed exhibit the same colors. Alternatively, the icon of fuel quantity and the icon of electric quantity may correspond to different color rendering parameters, that is, the icon of fuel quantity and the icon of electric quantity in the image to be displayed exhibit different colors.

The icon of fuel quantity and the icon of water temperature may correspond to the same color rendering parameters, that is, the icon of fuel quantity and the icon of water temperature in the image to be displayed exhibit the same colors. Alternatively, the icon of fuel quantity and the icon of water temperature may correspond to different color rendering parameters, that is, the icon of fuel quantity and the icon of water temperature in the image to be displayed exhibit different colors.

The icon of electric quantity and the icon of water temperature may correspond to the same color rendering parameters, that is, the icon of electric quantity and the icon of water temperature in the image to be displayed exhibit the same colors. Alternatively, the icon of electric quantity and the icon of water temperature may correspond to different color rendering parameters, that is, the icon of electric quantity and the icon of water temperature in the image to be displayed exhibit different colors.

In S102, the image to be displayed is generated according to the original image and the color rendering parameter.

In some examples, the color of the graphic mark of the original image is different from the color of the graphic mark of the image to be displayed, and the color of the graphic mark of the image to be displayed is the same as the color corresponding to the color rendering parameter.

For example, the color of the graphic mark of the original image is white, the color rendering parameter is Red, and the color of the graphic mark of the correspondingly generated image to be displayed is red.

For example, the color of the graphic mark of the original image is white, the color rendering parameter is Green, and the color of the graphic mark of the correspondingly generated image to be displayed is green.

For example, the color of the graphic mark of the original image is white, the color rendering parameter is Blue, and the color of the graphic mark of the correspondingly generated image to be displayed is blue.

For example, the color of the graphic mark of the original image is white, the color rendering parameter is Gray, and the color of the graphic mark of the correspondingly generated image to be displayed is gray.

In some examples, the image to be displayed includes an icon for representing fuel quantity information, the original image corresponding to the image to be displayed also includes an icon for representing fuel quantity information, and the color of the graphic mark of the icon for representing fuel quantity information included in the original image is white.

For example, in a case where the fuel quantity is relatively large (e.g., greater than a preset threshold), the color rendering parameter corresponding to the image to be displayed is Green, so that the color of the graphic mark of the icon for representing the fuel quantity information in the generated image to be displayed is green. When the user sees the green icon for representing the fuel quantity information, the user may learn about that the fuel quantity of the vehicle is sufficient at this time, and refueling is not required immediately.

For example, in a case where the fuel quantity is relatively small (e.g., less than a preset threshold), the color rendering parameter corresponding to the image to be displayed is Red, so that the color of the graphic mark of the icon for representing the fuel quantity information in the generated image to be displayed is red. When the user sees the red icon for representing the fuel quantity information, the user may learn about that the fuel quantity of the vehicle is insufficient at this time, and refueling may be required in time.

In this way, based on the image display method in the present embodiments, the color rendering parameters corresponding to the plurality of colors may be freely set. Therefore, in the icon design stage, it is conducive to the increment of the freedom degree of the icon design. Moreover, since the color may be freely selected, the more the preset color rendering parameters, the more the colors that can be exhibited by the icons. Thus, the information that can be transmitted by the icons may be further enriched.

In S103, the image to be displayed is displayed.

In some examples, the image to be displayed may be displayed using a display screen.

For example, the display screen may adopt an organic light-emitting diode (OLED) display device or a liquid crystal display (LCD).

Therefore, in the image display method provided by the embodiments of the present disclosure, since the bit number of color depth of the original image used in the storage and transmission process is less than the bit number of color depth of the image to be displayed, compared with the image display method in the related art, the storage space required to be occupied in the storage medium is small, thereby reducing the requirement on the total storage space of the storage medium, and further reducing the cost. In addition, in the process of transmitting the original image, since the storage space occupied by the original image is small, the speed of reading the original image is relatively fast, which may be beneficial to accelerating the response speed of image display. Moreover, since the color rendering parameters may be freely selected, in the icon design stage, it is conducive to the increment of the freedom degree of the icon design. The more the preset color rendering parameters, the more the colors that can be exhibited by the icons. Thus, the information that can be transmitted by the icons may be further enriched.

Figure 3:
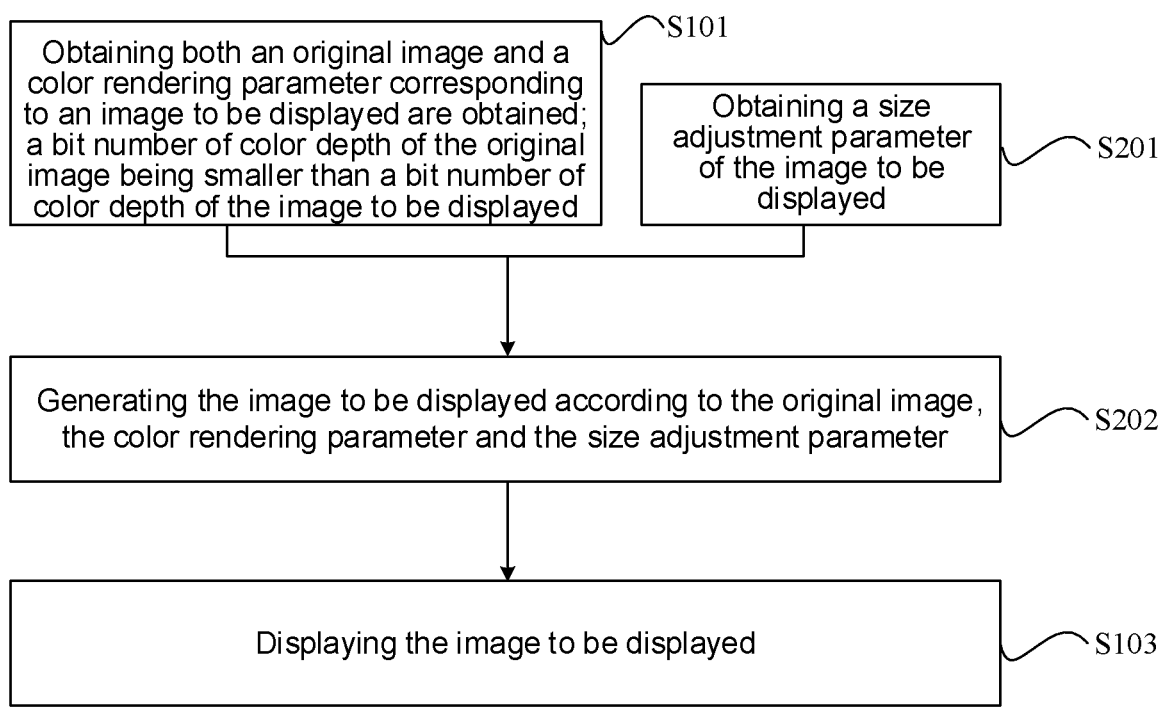
FIG. 3 is a flowchart of another image display method, in accordance with some embodiments of the present disclosure.

In some embodiments, based on the embodiment shown in FIG. 2, as shown in FIG. 3, the image display method further includes S201.

In S201, a size adjustment parameter of the image to be displayed is obtained.

In some examples, a type of vehicle condition information corresponds to a size adjustment parameter. The size adjustment parameter may be used to enlarge or maintain the size of the icon in the original image. That is, each type of vehicle condition information is assigned a size adjustment parameter.

For example, in a case where the vehicle condition information includes the fuel quantity, the electric quantity, and the water temperature, the size adjustment parameters respectively corresponding to the fuel quantity, the electric quantity, and the water temperature may be obtained accordingly.

In some embodiments, based on the embodiment shown in FIG. 2, as shown in FIG. 3, in a case where the image display method further includes S201, S102 in the image display method may be replaced with S202.

In S202, the image to be displayed is generated according to the original image, the color rendering parameter and the size adjustment parameter.

In some examples, the image to be displayed includes a plurality of types of vehicle condition information, the original image includes an icon corresponding to each type of vehicle condition information, each type of vehicle condition information corresponds to a size adjustment parameter, and the status of each type of vehicle condition information corresponds to a color rendering parameter. In this case, corresponding color rendering processing may be performed on the plurality of icons included in the original image respectively according to the color rendering parameters corresponding to the states of all types of vehicle condition information, and the size of the plurality of icons included in the original image may be adjusted respectively according to the size adjustment parameters corresponding to all types of vehicle condition information, so as to generate the image to be displayed.

For example, the vehicle condition information includes the fuel quantity, the electric quantity, and the water temperature. The size adjustment parameters corresponding to the fuel quantity, the electric quantity, and the water temperature may be generated according to the fuel quantity, the electric quantity and the water temperature, and the icons and the color rendering parameters corresponding to the fuel quantity, the electric quantity, and the water temperature may be obtained. Color rendering processing is performed on the icon corresponding to the fuel quantity according to the color rendering parameter corresponding to the fuel quantity, color rendering processing is performed on the icon corresponding to the electric quantity according to the color rendering parameter corresponding to the electric quantity, and color rendering processing is performed on the icon corresponding to the water temperature according to the color rendering parameter corresponding to the water temperature. The size of the icon corresponding to the fuel quantity is adjusted according to the size adjustment parameter corresponding to the fuel quantity, the size of the icon corresponding to the electric quantity is adjusted according to the size adjustment parameter corresponding to the electric quantity, and the size of the icon corresponding to the water temperature is adjusted according to the size adjustment parameter corresponding to the water temperature. Finally, the image to be displayed that may help the user obtain the fuel quantity information, the electric quantity information, and the water temperature information of the vehicle may be generated.

Thus, in the image display method provided in the present embodiments, the size of the icon included in the original image may be adjusted through the size adjustment parameter, so that icons of different sizes may be displayed in the image to be displayed, which is beneficial to increasing the freedom degree of the icon design. Moreover, the image in the storage and transmission process is still the original image with a small bit number of color depth, so that it will not increase the requirement for the storage space of the storage medium.

In some embodiments, the size adjustment parameter includes a size magnification factor.

Figure 4:
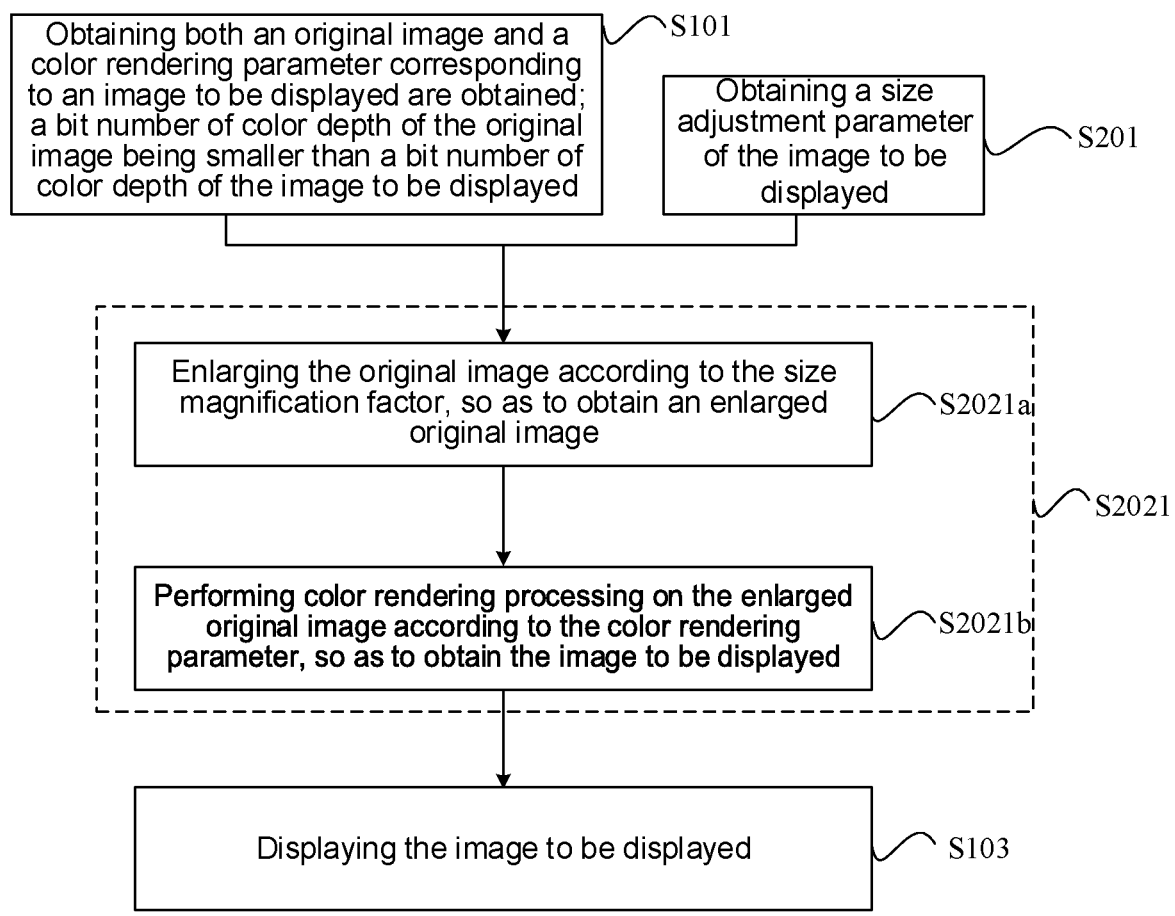
FIG. 4 is a flowchart of yet another image display method, in accordance with some embodiments of the present disclosure.

In some examples, as shown in FIG. 4, S202 includes S2021, and S2021 includes S2021*a* and S2021*b*.

In S2021*a*, the original image is enlarged according to the size magnification factor, so as to obtain an enlarged original image.

In S2021*b*, color rendering processing is performed on the enlarged original image according to the color rendering parameter, so as to obtain the image to be displayed.

For the description of S2021*b*, reference may be made to the foregoing description of S102, and details are not described here again. S2021*a* is further introduced below.

For example, the size magnification factor is greater than 1. In this case, the size of the enlarged original image is larger than the size of the original image, and then the size of the image to be displayed obtained after S2021*b* is also larger than the size of the original image. The size of the icon in the enlarged original image is also larger than the size of the icon in the original image.

It can be understood that the enlarged image is only subjected to the color rendering processing, and does not further undergo a size adjustment. Therefore, the enlarged display image and the image to be displayed are equal in size.

For example, the size magnification factor is equal to 2. In this case, the size of the enlarged original image is 2 times the size of the original image, and the size of the icon in the enlarged original image is also 2 times the size of the icon in the original image.

For example, the size of the original image is H×V, that is, the original image includes H rows of pixels, and the number of pixels included in each row of pixels is V. The size magnification factor is x, where x is greater than or equal to 1 (x≥1), and the size of the enlarged original image is xH×xV, that is, the enlarged original image includes xH row pixels, and the number of pixels included in each row of pixels is xV.

For example, the size magnification factor may be equal to 1. In this case, the original image is enlarged to 1 time according to the size magnification factor, that is, the size of the enlarged original image is equal to the size of the original image. The size of the icon in the enlarged original image is also equal to the size of the icon in the original image.

For example, as shown in Table 1, when the size of the original image is 128×128, in a case where the size magnification factor is 1, the size of the image to be displayed is 128×128; in a case where the size magnification factor is 2, the size of the image to be displayed is 256×256; and in a case where the size magnification factor is 4, the size of the image to be displayed is 512×512.

When the size of the original image is 256×256, in a case where the size magnification factor is 1, the size of the image to be displayed is 256×256; in a case where the size magnification factor is 2, the size of the image to be displayed is 512×512; and in a case where the size magnification factor is 4, the size of the image to be displayed is 1024×1024.

TABLE 1

| Size of the original image | Size magnification factor | Size of the image to be displayed |
| --- | --- | --- |
| 128 × 128 | 1 | 128 × 128 |
| 128 × 128 | 2 | 256 × 256 |
| 128 × 128 | 4 | 512 × 512 |
| 256 × 256 | 1 | 256 × 256 |
| 256 × 256 | 2 | 512 × 512 |
| 256 × 256 | 4 | 1024 × 1024 |

For example, in a case that the image to be displayed includes a plurality of types of vehicle condition information, the obtained original image includes icons corresponding to all types of vehicle condition information. The size magnification factors corresponding to any two types of vehicle condition information may be the same or different. That is, the icon corresponding to each type of vehicle condition information has a separate size magnification factor, and different icons may be enlarged in size according to actual needs, which is beneficial to increasing the freedom degree of the icon design.

For example, the vehicle condition information includes the fuel quantity, the electric quantity, and the water temperature. The size adjustment parameters corresponding to the fuel quantity, the electric quantity and the water temperature may be obtained according to the fuel quantity, the electric quantity, and the water temperature.

Figure 5:
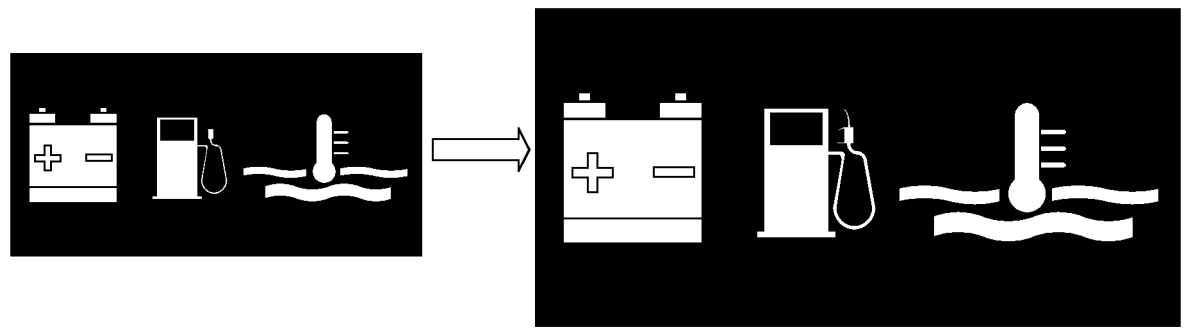
FIG. 5 is a schematic diagram of an image display method, in accordance with some embodiments of the present disclosure.

For example, as shown in FIG. 5, the size magnification factors included in the size adjustment parameters are 2. Then, the size of the icon of the fuel quantity displayed in the image to be displayed is 2 times the size of the icon of the fuel quantity in the original image, the size of the icon of the electric quantity displayed in the image to be displayed is 2 times the size of the icon of the electric quantity in the original image, and the size of the icon of the water temperature displayed in the image to be displayed is 2 times the size of the icon of the water temperature in the original image.

Figure 6:
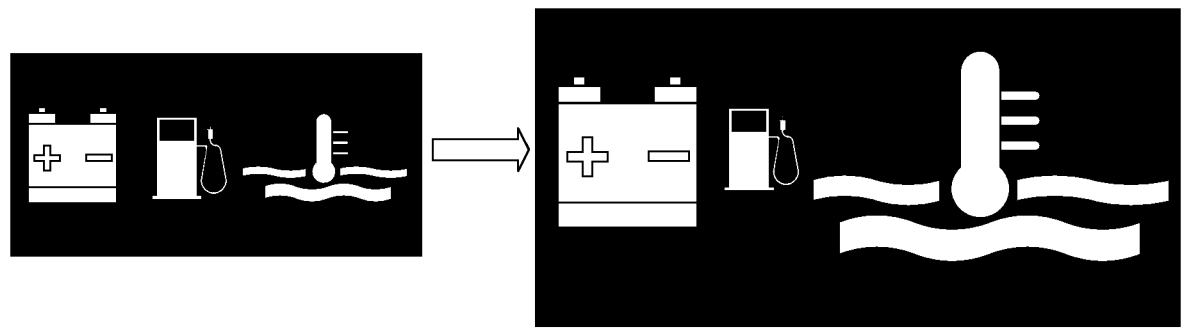
FIG. 6 is a schematic diagram of another image display method, in accordance with some embodiments of the present disclosure.

For example, as shown in FIG. 6, the size magnification factor corresponding to the fuel quantity is 1, the size magnification factor corresponding to the electric quantity is 2, and the size magnification factor corresponding to the water temperature is 4. Then, the size of the icon of the fuel quantity displayed in the image to be displayed is equal to the size of the icon of the fuel quantity in the original image, the size of the icon of the electric quantity displayed in the image to be displayed is 2 times the size of the icon of the electric quantity in the original image, and the size of the icon of the water temperature displayed in the image to be displayed is 4 times the size of the icon of the water temperature in the original image.

Figure 7:
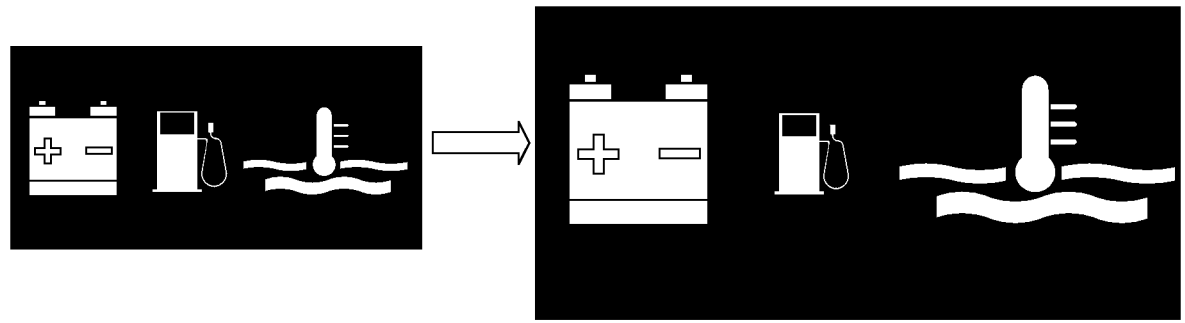
FIG. 7 is a schematic diagram of yet another image display method, in accordance with some embodiments of the present disclosure.

For example, as shown in FIG. 7, the size magnification factor corresponding to the fuel quantity is 1, the size magnification factor corresponding to the electric quantity is 2, and the size magnification factor corresponding to the water temperature is also 2. Then, the size of the icon of the fuel quantity displayed in the image to be displayed is equal to the size of the icon of the fuel quantity in the original image, the size of the icon of the electric quantity displayed in the image to be displayed is 2 times the size of the icon of the electric quantity in the original image, and the size of the icon of the water temperature displayed in the image to be displayed is 2 times the size of the icon of the water temperature in the original image.

Figure 8:
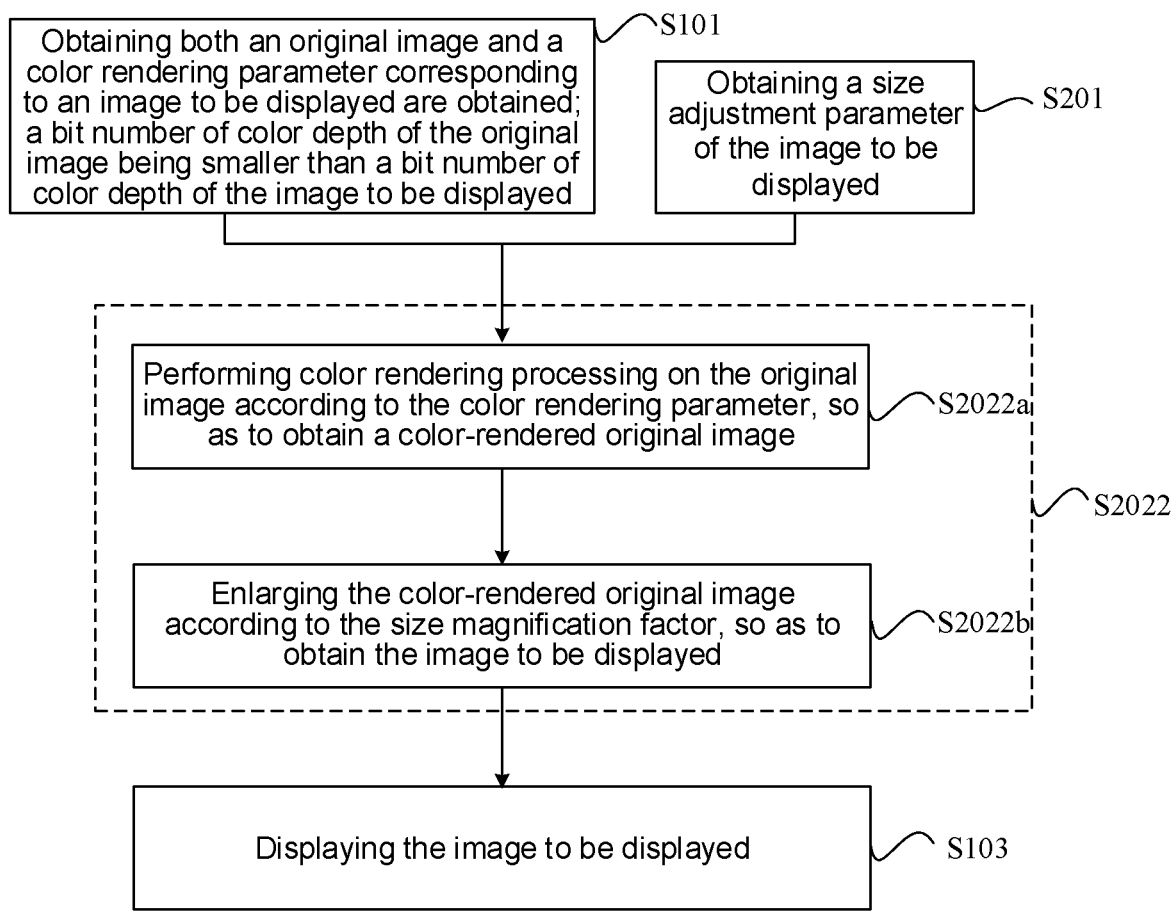
FIG. 8 is a flowchart of yet another image display method, in accordance with some embodiments of the present disclosure.

In some examples, as shown in FIG. 8, S202 includes S2022, and S2022 includes S2022a and S2022b.

In S2022a, color rendering processing is performed on the original image according to the color rendering parameter, so as to obtain a color-rendered original image.

For the description of S2022a, reference may be made to the foregoing description of S102, and details are not described here again.

In S2022b, the color-rendered original image is enlarged according to the size magnification factor, so as to obtain the image to be displayed.

For the description of S2022b, reference may be made to the foregoing description of S2021a, and details are not described here again.

Therefore, in the image display method in the present embodiments, the size adjustment parameter is obtained, the size of the original image is adjusted according to the size adjustment parameter, and then the size of the image to be displayed may be adjusted. As a result, it may increase the freedom degree of the icon design, thereby increasing the expression form of the icon in the image to be displayed. In addition, while the size (e.g., the enlarged size) of the image to be displayed is adjusted, since an image stored in the storage medium is the original image with a low bit number of color depth and a small size, there is no need to increase the storage space of the storage medium, which is beneficial to further reducing the required storage space of the storage medium.

Figure 9:
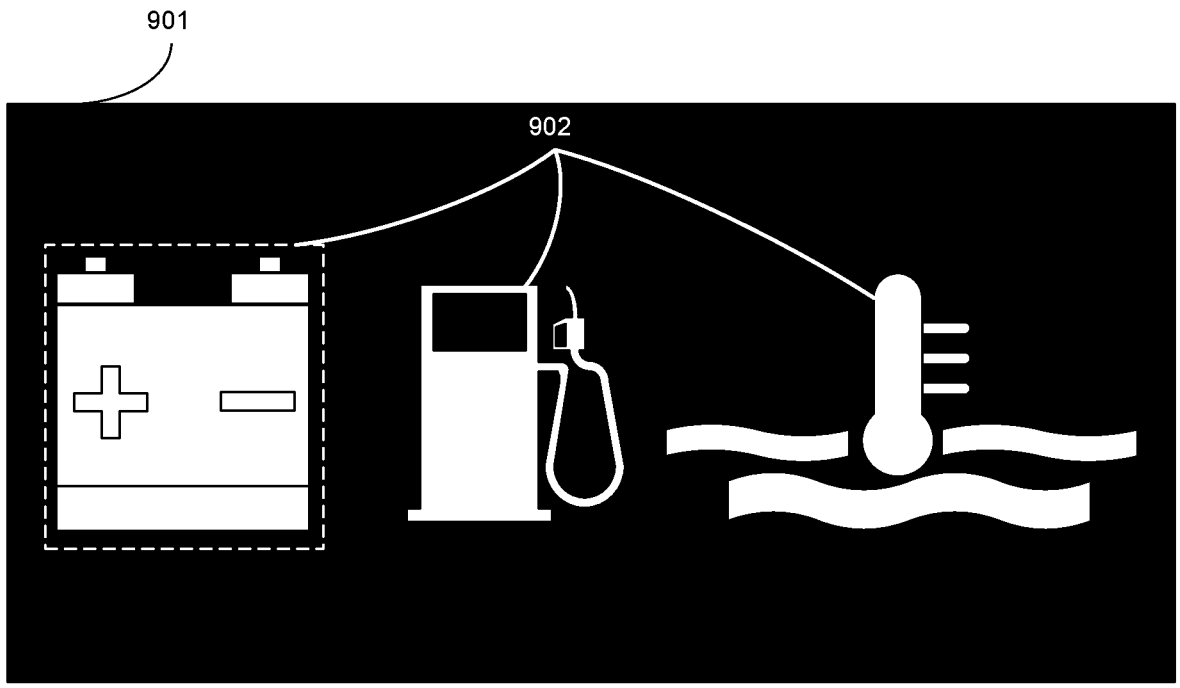
FIG. 9 is a schematic diagram of an original image, in accordance with some embodiments of the present disclosure.
Figure 10:
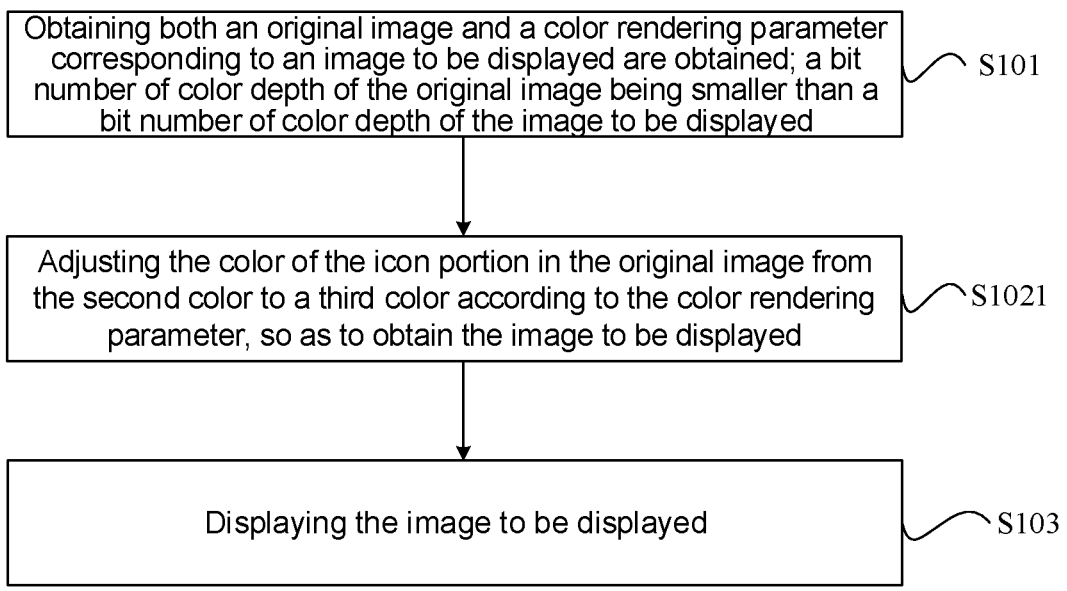
FIG. 10 is a flowchart of yet another image display method, in accordance with some embodiments of the present disclosure.

In some embodiments, as shown in FIG. 9, the original image includes a background portion 901 and an icon portion 902, a color of the background portion is a first color, and a color of the icon portion is a second color. As shown in FIG. 10, the foregoing S102 includes S1021.

In S1021, the color of the icon portion in the original image is adjusted from the second color to a third color according to the color rendering parameter, so as to obtain the image to be displayed.

In some examples, the image to be displayed includes a plurality of pixels, some pixels in the plurality of pixels constitute the icon portion, and the other pixels in the plurality of pixels constitute the background portion. The arrangement combination of multiple pixels included in the icon portion may constitute special graphic marks. In this way, the user may obtain the corresponding information according to the special graphic marks constituted by the icon portion.

For example, the plurality of pixels may be arranged in an array, that is, the plurality of pixels may be arranged in a plurality of lines in a first direction, and arranged in a plurality of lines in a second direction.

For example, as shown in FIG. 9, the original image includes the icon for representing the fuel quantity information. The arrangement combination of the multiple pixels included in the icon portion may produce a petrol station mark. In this way, when the user sees the petrol station mark, the user may learn about that the icon represents the fuel quantity information.

For example, as shown in FIG. 9, the original image includes the icon for representing the electric quantity information. The arrangement combination of the multiple pixels included in the icon portion may produce a storage battery mark. In this way, when the user sees the storage battery mark, the user may learn about that the icon represents the electric quantity information.

For example, as shown in FIG. 9, the original image includes the icon for representing the water temperature information. The arrangement combination of the multiple pixels included in the icon portion may produce a thermometer mark. In this way, when the user sees the thermometer mark, the user may learn about that the icon represents the water temperature information.

In some examples, the first color, the second color, and the third color are different. That is, the color of the icon portion and the color of the background portion are different, so that the user may distinguish the icon portion and the background portion according to the colors, and further recognize the special graphic mark of the icon portion, thereby obtaining the effective information in time.

For example, the first color is one of black or white, and the second color is the other one of black and white. The third color includes at least one of red, green, blue, and gray.

It will be noted that in the related art, the bit number of color depth of the image in the storage and transmission process is relatively large, and accordingly, the memory space required to be occupied is relatively large. Thus, for the icons of the same type (e.g., only the colors of the graphic marks are different), every time one color is added, the number of stored icons needs to increase by one, and a large storage space needs to be occupied additionally. Therefore, in the icon design stage, due to the cost pressure brought by the large storage space, the freedom degree of icon color selection is greatly limited. That is, in the related art, the colors of icons included in the image are generally single and fixed.

Based on the image display method in the present embodiments, for each type of icons, every time one color is added, only one color rendering parameter needs to be additionally added in the storage medium, so that the color of the icon portion in the original image may be adjusted from the original second color to the new third color corresponding to the newly added color rendering parameter according to the newly added color rendering parameter. In this way, the number of the icons included in the original image does not need to increase by one. Therefore, compared with the related art, the image display method in the present embodiments does not need to additionally occupy a large storage space when increasing the number of colors that can be displayed by the icons, so that the requirement on the total storage space of the storage medium is relatively small, and the cost pressure is relatively small. Further, in the icon design stage, the colors of the icons in the image to be displayed may be freely edited by increasing the color rendering parameters, thereby meeting requirements of different users.

Figure 11:
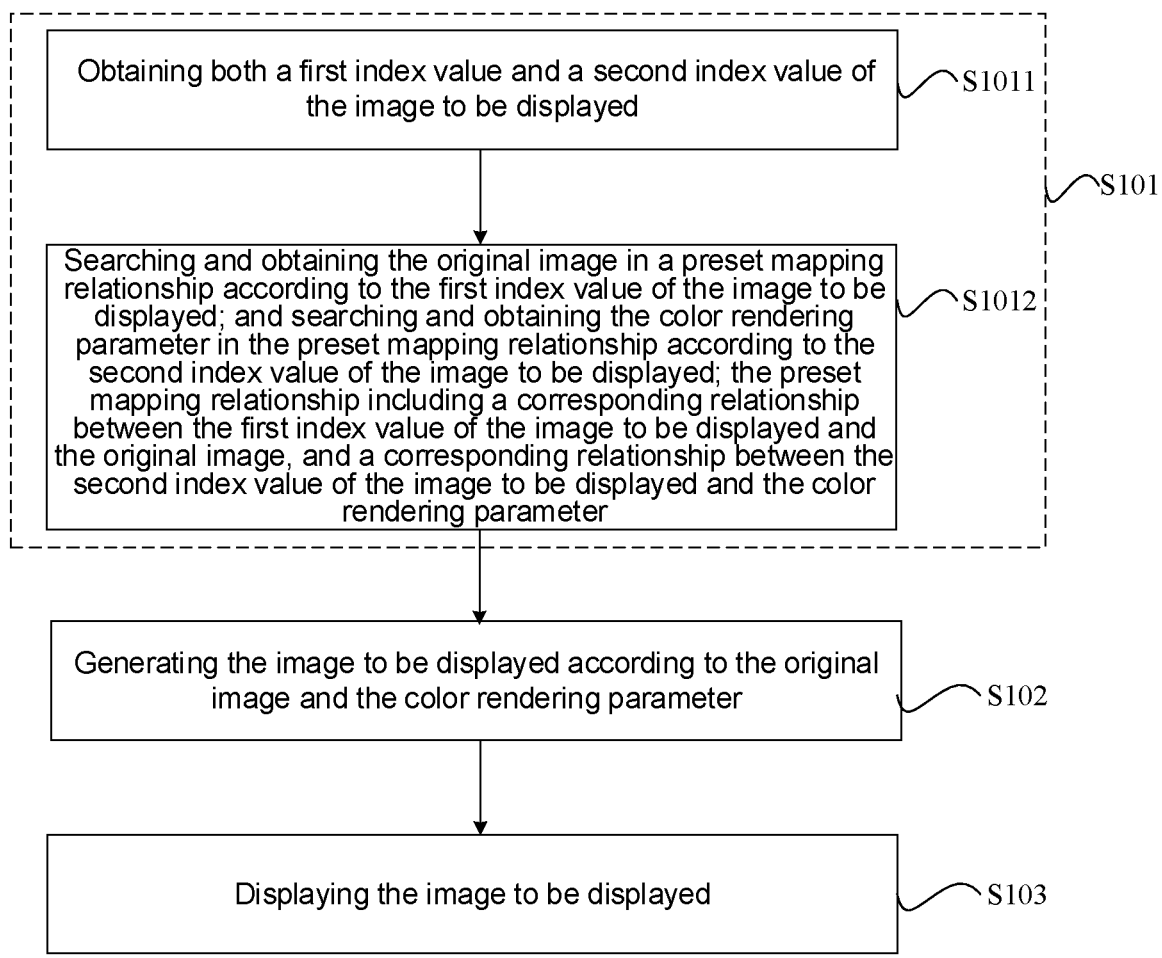
FIG. 11 is a flowchart of yet another image display method, in accordance with some embodiments of the present disclosure.

In some embodiments, as shown in FIG. 11, S101 includes S1011 to S1012.

In S1011, both a first index value and a second index value of the image to be displayed are obtained.

In some examples, the first index value corresponds to the original image, and the second index value corresponds to the color rendering parameter.

In some examples, there are a plurality of first index values, and a first index value corresponds to a type of vehicle condition information.

For example, the vehicle condition information includes the fuel quantity, the electric quantity, and the water temperature. In this case, the fuel quantity corresponds to a first index value, the electric quantity corresponds to another first index value, and the water temperature corresponds to yet another first index value. That is, in a case where the fuel quantity information is received, the first index value corresponding to the fuel quantity information may be obtained; in a case where the electric quantity information is received, the first index value corresponding to the electric quantity information may be obtained; and in a case where the water temperature information is received, the first index value corresponding to the water temperature information may be obtained.

In some examples, there are a plurality of second index values, and a second index value corresponds to a state of a type of the vehicle condition information.

For example, the vehicle condition information includes the fuel quantity, the electric quantity, and the water temperature. In this case, the fuel quantity in a high fuel quantity state corresponds to a second index value, and the fuel quantity in a low fuel quantity state corresponds to another second index value; the electric quantity in a high electric quantity state corresponds to yet another second index value, and the electric quantity in a low electric quantity state corresponds to yet another second index value; the water temperature in an abnormal temperature (e.g., an excessively high temperature or an excessively low temperature) state corresponds to yet another second index value, and the water temperature in a normal temperature state corresponds to yet another second index value.

In S1012, the original image is searched and obtained in a preset mapping relationship according to the first index value of the image to be displayed, and the color rendering parameter is searched and obtained in the preset mapping relationship according to the second index value of the image to be displayed. The preset mapping relationship includes a corresponding relationship between the first index value of the image to be displayed and the original image, and a corresponding relationship between the second index value of the image to be displayed and the color rendering parameter.

In some examples, as shown in Table 2, in the preset mapping relationship, there are a plurality of first index values, a first index value corresponds to an icon, and a second index value corresponds to a color rendering parameter.

For example, the first index value 1 corresponds to the first icon, the first index value 2 corresponds to the second icon, . . . , the first index value N corresponds to the Nth icon. N is a positive integer, and a value of N is related to the maximum number of the icons included in the image to be displayed or in the original image, and may be set according to actual needs.

For example, if 4 icons need to be displayed in the image to be displayed or the original image, the value of N is 4.

For example, the second index value 1 corresponds to the first color rendering parameter, the second index value 2 corresponds to the second color rendering parameter, . . . , the second index value M corresponds to the Mth color rendering parameter. M is a positive integer, and a maximum value of M is related to the bit number of color depth of the image to be displayed, and may be specifically set according to actual needs.

For example, if the bit number of color depth of the image to be displayed is 16 bits, that is, at most $2^{16}$ (which is equal to 32768) colors may be displayed, the value of M may be set to be a positive integer less than or equal to 32768.

For example, if the bit number of color depth of the image to be displayed is 24 bits, that is, at most $2^{24}$ (which is equal to 16777216) colors may be displayed, the value of M may be set to be a positive integer less than or equal to 16777216.

TABLE 2 a preset mapping relationship

| First index value | Original image | Second index value | Color rendering parameter |
|---|---|---|---|
| 1 | First icon | 1 | First color rendering parameter |
| 2 | Second icon | 2 | Second color rendering parameter |
| 3 | Third icon | 3 | Third color rendering parameter |
| 4 | Fourth icon | 4 | Fourth color rendering parameter |
| . . . | . . . | . . . | . . . |
| N | Nth icon | M | Mth color rendering parameter |

In some examples, a first index value corresponding to a type of vehicle condition information corresponds to an icon for representing the type of vehicle condition information.

For example, the vehicle condition information includes the fuel quantity, the electric quantity, and the water temperature. In this case, a first index value corresponding to the fuel quantity corresponds to an icon for representing the fuel quantity information, a first index value corresponding to the electric quantity corresponds to an icon for representing the electric quantity information, and a first index value corresponding to the water temperature corresponds to an icon for representing the water temperature information.

For example, in the preset mapping relationship shown in Table 3, the first index value 1 corresponds to the icon of the fuel quantity, the first index value 2 corresponds to the icon of the electric quantity, and the first index value 3 corresponds to the icon of the water temperature. In a case where the first index value 1 is obtained, the icon of the fuel quantity in the original image may be searched and obtained in the preset mapping relationship according to the first index value 1. In a case where the first index value 2 is obtained, the icon of the electric quantity in the original image may be searched and obtained in the preset mapping relationship according to the first index value 2. In a case where the first index value 3 is obtained, the icon of the water temperature in the original image may be searched and obtained in the preset mapping relationship according to the first index value 3.

TABLE 3 a preset mapping relationship

| First index value | Original image | Second index value | Color rendering parameter |
|---|---|---|---|
| 1 | Icon of fuel quantity | 1 | Color rendering parameter a |
| 2 | Icon of electric quantity | 2 | Color rendering parameter b |
| 3 | Icon of water temperature | 3 | Color rendering parameter c |
| | | 4 | Color rendering parameter d |
| | | 5 | Color rendering parameter e |
| | | 6 | Color rendering parameter f |

In some examples, a second index value corresponding to a state of a type of the vehicle condition information corresponds to a color rendering parameter.

For example, the vehicle condition information includes the fuel quantity, the electric quantity, and the water temperature. In this case, a second index value corresponding to a high fuel quantity corresponds to a color rendering parameter, and a second index value corresponding to a low fuel quantity corresponds to another color rendering parameter; a second index value corresponding to a high electric quantity corresponds to a color rendering parameter, and a second index value corresponding to a low electric quantity corresponds to another color rendering parameter; and a second index value corresponding to the water temperature with the abnormal temperature corresponds to a color rendering parameter, and a second index value corresponding to the water temperature with the normal temperature corresponds to another color rendering parameter.

For example, in the preset mapping relationship shown in Table 3, there are 6 color rendering parameters. The second index value 1 corresponds to the color rendering parameter a, the second index value 2 corresponds to the color rendering parameter b, the second index value 3 corresponds to the color rendering parameter c, the second index value 4 corresponds to the color rendering parameter d, the second index value 5 corresponds to the color rendering parameter e, and the second index value 6 corresponds to the color rendering parameter f.

The second index value corresponding to the high fuel quantity, the second index value corresponding to the low fuel quantity, the second index value corresponding to the high electric quantity, the second index value corresponding to the low electric quantity, the second index value corresponding to the water temperature with the abnormal temperature (e.g., the high water temperature), and the second index value corresponding to the water temperature with the normal temperature may each be any of the second index values 1 to 6.

In addition, the second index value corresponding to the high fuel quantity and the second index value corresponding to the low fuel quantity are different second index values, so that different color rendering parameters may be searched and obtained in the preset mapping relationship. Thus, the icon of the fuel quantity included in the image to be displayed may present different colors in the high fuel quantity state and the low fuel quantity state, and then the user may quickly know, according to the color of the icon of the fuel quantity, whether the vehicle is in a low fuel quantity state, thereby making the correct driving behaviors.

The second index value corresponding to the high electric quantity and the second index value corresponding to the low electric quantity are different second index values, so that different color rendering parameters may be searched and obtained in the preset mapping relationship. Thus, the icon of the electric quantity included in the image to be displayed may present different colors in the high electric quantity state and the low electric quantity state, and then the user may quickly know, according to the color of the icon of the electric quantity, whether the vehicle is in a low electric quantity state, thereby making the correct driving behaviors.

The second index value corresponding to the high water temperature and the second index value corresponding to the water temperature with the normal temperature are different second index values, so that different color rendering parameters may be searched and obtained in the preset mapping relationship. Thus, the icon of the water temperature included in the image to be displayed may present different colors in the high water temperature state and the normal water temperature state, and then the user may quickly know, according to the color of the icon of the water temperature, whether the vehicle is in a high water temperature state, thereby making a correct driving behavior.

In some examples, the two second index values corresponding to the states of any two types of vehicle condition information may correspond to the same color rendering parameter.

For example, the vehicle condition information includes the fuel quantity, the electric quantity, and the water temperature. In this case, the second index value corresponding to the high fuel quantity, the second index value corresponding to the high electric quantity, and the second index value corresponding to the water temperature with the normal temperature may correspond to a same color rendering parameter (e.g., a color rendering parameter corresponding to the red color). The second index value corresponding to the low fuel quantity, the second index value corresponding to the low electric quantity, and the second index value corresponding to the water temperature with the abnormal temperature may correspond to another same color rendering parameter (e.g., a color rendering parameter corresponding to the green color).

Figure 12:
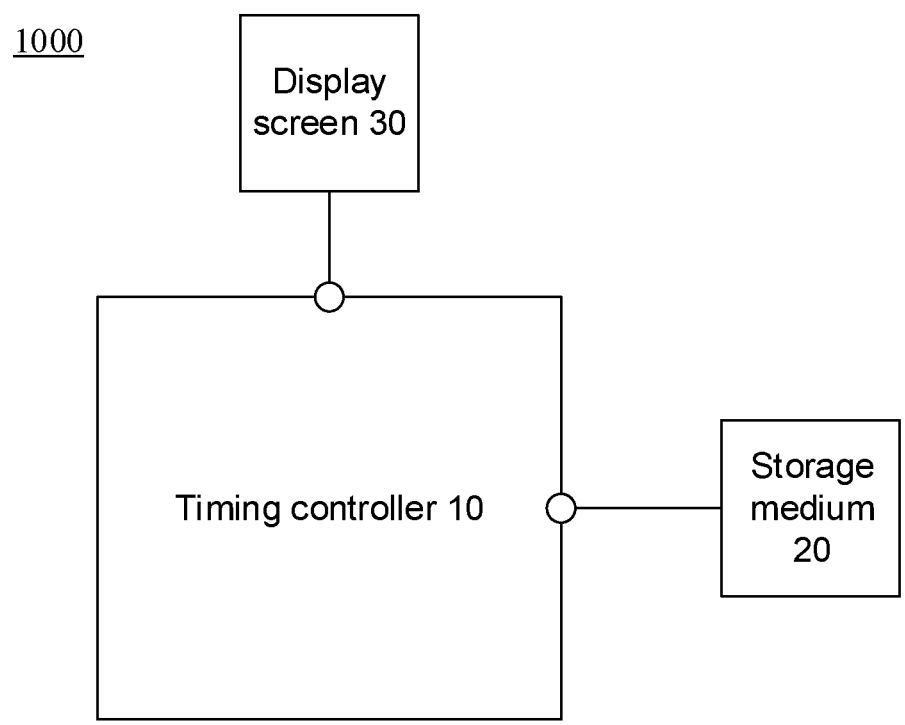
FIG. 12 is a structural diagram of a display device, in accordance with some embodiments of the present disclosure.

In some embodiments, as shown in FIG. 12, a display device 1000 is provided for realizing the image display method as described in some of the above embodiments. The display device 1000 includes a timing controller 10, and a storage medium 20 and a display screen 30 that are coupled to the timing controller 10.

The storage medium 20 may be a read-only memory (ROM) or a static storage device of any other type that may store static information and instructions, a random access memory (RAM) or a dynamic storage device of any other type that may store information and instructions, an electrically erasable programmable read-only memory (EEPROM), a magnetic disk storage medium or any other magnetic storage device, or any other medium that can be used to carry or store desired program codes in a form of instructions or data structures and that can be accessed by a computer, but is not limited thereto.

The display screen 30 may be a light-emitting diode (LED) display screen, an organic light-emitting diode (OLED) display screen, a quantum dot light-emitting diode (QLED) display screen, or a liquid crystal display (LCD) display screen.

Figure 13:
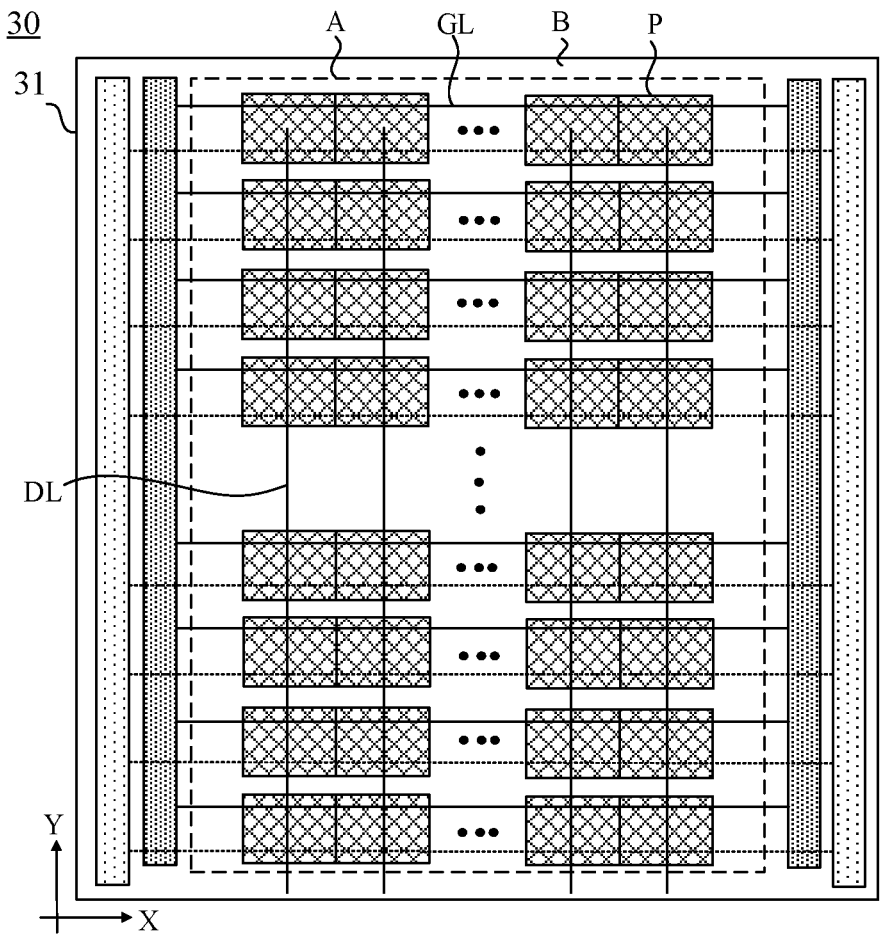
FIG. 13 is a structural diagram of a display screen, in accordance with some embodiments of the present disclosure.

In some examples, taking the display screen 30 as the LED display screen, the OLED display screen or the QLED display screen as an example, as shown in FIG. 13, the display screen 30 includes a substrate 31, and a plurality of pixels P, a plurality of gate lines GL, and a plurality of data lines DL disposed on a side of the substrate 31.

The type of the substrate 31 may varies, and may be selected according to actual requirements.

For example, the substrate 31 may be a rigid substrate. The rigid substrate may be, for example, a glass substrate or a polymethyl methacrylate (PMMA) substrate.

For example, the substrate 31 may be a flexible substrate. The flexible substrate may be, for example, a polyethylene terephthalate (PET) substrate, a polyethylene naphthalate (PEN) substrate, or a polyimide (PI) substrate.

For example, as shown in FIG. 13, the display screen 30 has a display area A, and a peripheral area B disposed on side(s) of the display area A. The "side(s)" refers to one side, two sides, three sides, or surrounding sides of the display area A. That is, the peripheral area B may be located on one side, two sides, or three sides of the display area A; alternatively, the peripheral area B may be disposed around the display area A.

For example, as shown in FIG. 13, the plurality of pixels P, the plurality of gate lines GL, and the plurality of data lines DL may be located in the display area A, and the plurality of gate lines GL may extend in the first direction X, and the plurality of data lines DL may extend in the second direction Y.

For example, an included angle between the first direction X and the second direction Y is 90°, that is, the gate line GL and the data line DL are arranged perpendicular to each other.

Figure 14:
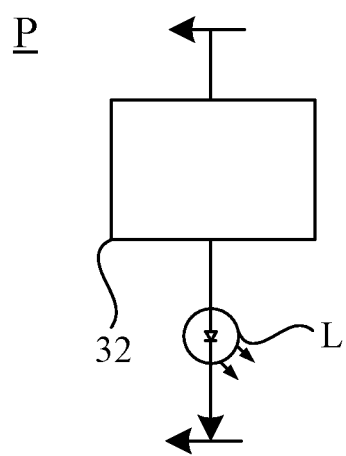
FIG. 14 is a structural diagram of a pixel, in accordance with some embodiments of the present disclosure.

For example, as shown in FIG. 14, in the plurality of pixels P, each pixel P may include a pixel driving circuit 32 and a light emitting device L electrically connected to the pixel driving circuit 32.

For example, the light emitting device L may be an OLED, a QLED, or an LED.

For example, the plurality of pixels P may be arranged in an array, that is, the plurality of pixels P may be arranged in a plurality of lines in the first direction X, and arranged in a plurality of lines in the second direction Y. Pixels P arranged in a line in the first direction X may be referred to as the same row of pixels P, and pixels P arranged in a line in the second direction Y may be referred to as the same column of pixels P. A plurality of pixel driving circuits 32 in the same row of pixels P may be electrically connected to at least one gate line GL, and a plurality of pixel driving circuits 32 in the same column of pixels P may be electrically connected to a data line DL. The number of the gate lines GL electrically connected to the plurality of pixel driving circuits 32 in the same row of pixels P may be set according to the structure of the pixel driving circuit 32. The embodiments of the present disclosure will be described in an example where the plurality of pixel driving circuits 32 in the same row of pixels P are electrically connected to a single gate line GL.

In some examples, the storage medium 20 is configured to store an original image and color rendering parameters. The timing controller 10 is configured to obtain the original image and a color rendering parameter corresponding to an image to be displayed from the storage medium 20, and generate data of the image to be displayed according to the original image and the color rendering parameter. The display screen 30 is configured to display the image to be displayed according to the data of the image to be displayed generated by the timing controller 10. The bit number of color depth of the original image is smaller than the bit number of color depth of the image to be displayed.

The types of the icons included in the original image stored in the storage medium 20 and the types of the color rendering parameters stored in the storage medium 20 are not limited in the present disclosure, which may be set according to actual needs.

For example, the original image includes an icon corresponding to the fuel quantity, an icon corresponding to the electric quantity, an icon corresponding to the water temperature, an icon corresponding to the high beam light, an icon corresponding to the low beam light, an icon corresponding to the seat belt prompt, and the like.

For example, the color rendering parameters include a color rendering parameter for implementing red rendering, a color rendering parameter for implementing blue rendering, a color rendering parameter for implementing green rendering, a color rendering parameter for implementing gray rendering, and the like.

The display device 1000 provided in the present embodiments is used to implement the image display method described in some of the above embodiments, and has the same beneficial effects as the image display method provided in some of the above embodiments, and details are not described here again.

Figure 15:
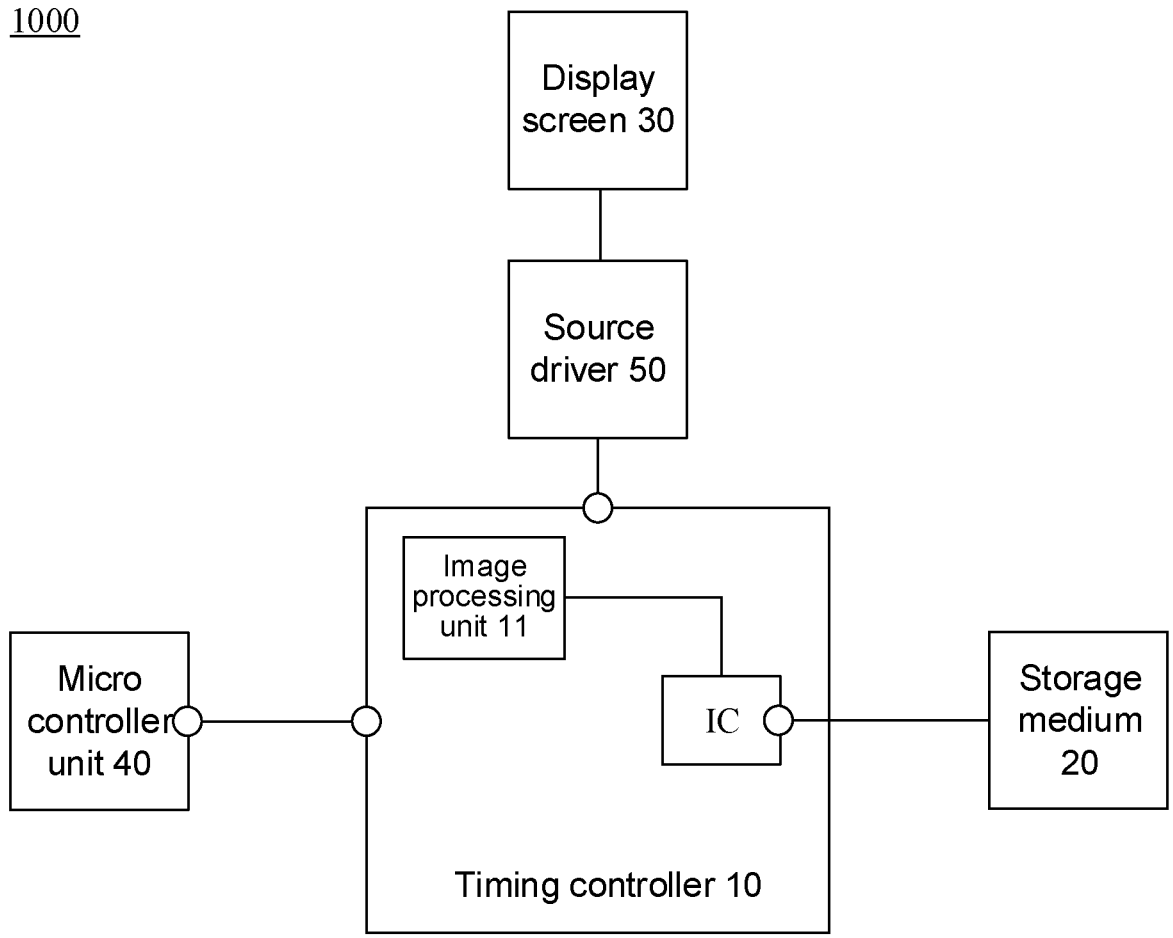
FIG. 15 is a structural diagram of another display device, in accordance with some embodiments of the present disclosure.

In some embodiments, as shown in FIG. 15, the display device 1000 further includes a micro controller unit 40 coupled to the timing controller 10. The micro controller unit 40 is configured to send an instruction for obtaining the image to be displayed to the timing controller 10. The instruction includes both a first index value and a second index value of the image to be displayed. The storage medium 20 has stored a preset mapping relationship therein. The preset mapping relationship includes a corresponding relationship between the first index value of the image to be displayed and the original image, and a corresponding relationship between the second index value of the image to be displayed and the color rendering parameter. The timing controller 10 is further configured to obtain both the first index value and the second index value of the image to be displayed, search and obtain the original image from the preset mapping relationship in the storage medium 20 according to the first index value of the image to be displayed; and search and obtain the color rendering parameter from the preset mapping relationship in the storage medium 20 according to the second index value of the image to be displayed.

The micro controller unit (MCU), also known as a single-chip microcomputer or a mono-chip microcomputer, is an integrated circuit level computer formed by appropriately reducing the frequency and specification of a central processing unit (CPU), and integrating peripheral interfaces such as a memory, a timer, a universal serial bus (USB), a digital-to-analog conversion, a universal asynchronous receiver/transmitter (UART), a serial peripheral interface (SPI), and a direct memory access (DMA) into a single integrated circuit, and performs different combination control for different application scenarios.

In some examples, the micro controller unit 40 may receive a plurality of types of the vehicle condition information, and generate an instruction according to the vehicle condition information. The instruction includes the first index value corresponding to the original image, and the second index value corresponding to the color rendering parameter.

In some embodiments, the instructions further include a size adjustment parameter. The timing controller 10 is further configured to generate the image to be displayed according to the original image, the color rendering parameter, and the size adjustment parameter.

For the description of the size adjustment parameter and the function that can be implemented by the timing controller, reference may be made to the description in the foregoing embodiments, and details are not described here again.

In some embodiments, as shown in FIG. 15, the timing controller 10 includes an integrated circuit IC, and the integrated circuit IC is coupled to the storage medium 20. The integrated circuit IC is configured to store the original image and the color rendering parameter obtained from the storage medium 20.

The integrated circuit IC is a microelectronic device or component. Transistors, resistors, capacitors, inductors and other elements required in a circuit and wiring are interconnected together by adopting a certain process and fabricated on a small piece or several small pieces of semiconductor wafers or dielectric substrates, and then encapsulated in a tube shell, so as to generate a micro structure with the required circuit function.

In some examples, the integrated circuit IC includes RAM, and the RAM is used for temporarily storing the original image and the color rendering parameter obtained from the storage medium 20.

In some embodiments, the original image includes a background portion and an icon portion, a color of the background portion is a first color, and a color of the icon portion is a second color. As shown in FIG. 15, the timing controller 10 further includes an image processing unit 11 coupled to the integrated circuit IC. The image processing unit 11 is configured to adjust the color of the icon portion in the original image stored in the integrated circuit IC from the second color to a third color according to the color rendering parameter stored in the integrated circuit IC, so as to obtain the image to be displayed.

For description of the background portion, the icon portion, the first color, the second color and the third color, reference may be made to the description in the foregoing embodiments, and details are not described here again.

It will be additionally noted that the image processing unit 11 in the present embodiments may adjust the second color of the icon portion in the original image to the third color corresponding to the color rendering parameter according to the color rendering parameter. Therefore, different color rendering parameters are stored in the integrated circuit IC, so that the display device 1000 may realize the function of editable icon colors, and thus the display device 1000 may meet the requirements of different users, thereby improving the favor degree of the users.

In some examples, the image processing unit 11 may convert the original image with the low bit number of color depth into the image to be displayed with the high bit number of color depth according to the color rendering parameter.

For example, the bit number of color depth of the original image is 1 bit, and the bit number of color depth of the image to be displayed is 24 bits. The image processing unit 11 may convert the data represented by 1 bit into data represented by 24 bits according to the color rendering parameter, so as to change the bit number of color depth of the image, thereby converting the original image into the image to be displayed.

The function of the image processing unit 11 will be described in detail below by considering an example in which the bit number of color depth of the original image is 1 bit, the bit number of color depth of the image to be displayed is 24 bits, and each pixel includes three sub-pixels of R, G, and B. In this case, the R sub-pixel, the G sub-pixel, and the B sub-pixel in each pixel included in the original image may each have two gray scales (0 or 1), and the R sub-pixel, the G sub-pixel, and the B sub-pixel in each pixel included in the image to be displayed may each have 256 gray scales (any of 0 to 255).

As shown in Table 4, each pixel constituting the icon portion of the original image includes an R sub-pixel, a G sub-pixel and a B sub-pixel, where the gray scale of the R sub-pixel is 1, the gray scale of the G sub-pixel is 1, and the gray scale of the B sub-pixel is 1. In this way, the pixel composed of the R sub-pixel, the G sub-pixel and the B sub-pixel may, for example, emit white light, so that the icon portion of the original image is white. The β value corresponding to the color rendering parameter represents an adjustment value of the gray scale of the R sub-pixel, the G sub-pixel, or the B sub-pixel of the icon portion of the original image.

The image processing unit performs color rendering processing on the original image according to the β value corresponding to the red rendering parameter, so as to obtain the image to be displayed. Each pixel of the icon portion of the image to be displayed includes an R sub-pixel, a G sub-pixel and a B sub-pixel, where the gray scale of the R sub-pixel is 255, the gray scale of the G sub-pixel is 20, and the gray scale of the B sub-pixel is 1. In this way, the pixel composed of the R sub-pixel, the G sub-pixel and the B sub-pixel may emit red light, so that the user may see the red icon in the image to be displayed.

The image processing unit performs color rendering processing on the original image according to the β value corresponding to the green rendering parameter, so as to obtain the image to be displayed. Each pixel of the icon portion of the image to be displayed includes an R sub-pixel, a G sub-pixel and a B sub-pixel, where the gray scale of the R sub-pixel is 10, the gray scale of the G sub-pixel is 200, and the gray scale of the B sub-pixel is 1. In this way, the pixel composed of the R sub-pixel, the G sub-pixel and the B sub-pixel may emit green light, so that the user may see the green icon in the image to be displayed.

The image processing unit performs color rendering processing on the original image according to the β value corresponding to the blue rendering parameter, so as to obtain the image to be displayed. Each pixel of the icon portion of the image to be displayed includes an R sub-pixel, a G sub-pixel and a B sub-pixel, where the gray scale of the R sub-pixel is 10, the gray scale of the G sub-pixel is 2, and the gray scale of the B sub-pixel is 220. In this way, the pixel composed of the R sub-pixel, the G sub-pixel and the B sub-pixel may emit blue light, so that the user may see the blue icon in the image to be displayed.

The image processing unit performs color rendering processing on the original image according to the β value corresponding to the gray rendering parameter, so as to obtain the image to be displayed. Each pixel of the icon portion of the image to be displayed includes an R sub-pixel, a G sub-pixel and a B sub-pixel, where the gray scale of the R sub-pixel is 127, the gray scale of the G sub-pixel is 127, and the gray scale of the B sub-pixel is 127. In this way, the pixel composed of the R sub-pixel, the G sub-pixel and the B sub-pixel may emit gray light, so that the user may see the gray icon in the image to be displayed.

TABLE 4

| R, G, B gray scales of each pixel included in the icon portion of the original image | Color rendering parameter | β value corresponding to the color rendering parameter | R, G, B gray scales of each pixel included in the icon portion of the image to be displayed |
|---|---|---|---|
| [1, 1, 1] | Red rendering parameter | [255, 20, 1] | [255, 20, 1] |
| [1, 1, 1] | Green rendering parameter | [10, 200, 1] | [10, 200, 1] |
| [1, 1, 1] | Blue rendering parameter | [10, 2, 220] | [10, 2, 220] |
| [1, 1, 1] | Gray rendering parameter | [127, 127, 127] | [127, 127, 127] |

In some embodiments, as shown in FIG. 15, the display device 1000 further includes a source driver 50. The source driver 50 is coupled to the timing controller 10 and coupled to the display screen 30. The source driver 50 is configured to receive data of the image to be displayed generated by the timing controller 10, and generate a driving signal according to the data of the image to be displayed, so as to drive the display screen 30 to display the image to be displayed.

It will be noted that, during display on the display screen 30, the pixel P may receive the scan signal from the corresponding gate line GL and the data signal from the corresponding data line DL to generate a driving voltage, so as to drive the light emitting device L in the pixel P to emit light. The plurality of pixels P cooperate with each other, so that the display screen 30 may display images.

In some examples, the source driver 50 may be coupled to the plurality of data lines DL, and the driving signal may be, for example, the data signal.

The communication protocol between the timing controller 10 and the micro controller unit 40 and the communication protocol between the integrated circuit IC and the storage medium 20 are not limited in the present disclosure, which may be selected according to actual needs.

In some embodiments, the communication protocol between the timing controller 10 and the micro controller unit 40 includes an SPI communication protocol or an inter-integrated circuit (I2C) protocol. The communication protocol between the integrated circuit IC and the storage medium 20 includes the SPI communication protocol or the I2C protocol.

The SPI protocol is a high-speed, full-duplex, synchronous communication bus protocol, and the SPI protocol may realize high-speed data transmission, and need to take up few pins, which is beneficial to saving wiring space.

The I2C protocol is a simple, bidirectional two-wire synchronous serial bus. It requires two wires to transfer information between devices connected to the bus.

In some examples, the micro controller unit 40 includes an SPI protocol interface or an I2C protocol interface. The timing controller 10 may be coupled to the micro controller unit 40 through the SPI protocol interface or the I2C protocol interface, thereby achieving communication between the timing controller 10 and the micro controller unit 40.

In some examples, the integrated circuit IC includes an SPI protocol interface or an I2C protocol interface. The storage medium 20 may be coupled to the integrated circuit IC through the SPI protocol interface or the I2C protocol interface, thereby achieving communication between the integrated circuit IC and the storage medium 20.

The operation process of the display device 1000 will be exemplarily illustrated below by considering an example in which the display device 1000 includes the timing controller 10, and the storage medium 20, the display screen 30, and the micro controller unit 40 that are coupled to the timing controller 10; the timing controller includes the integrated circuit IC and the image processing unit 11 coupled to the integrated circuit IC; the integrated circuit IC includes the RAM; and the storage medium 20 stores the preset mapping relationship shown in Table 3 therein.

In an exemplary operation process, the instruction for obtaining an image to be displayed sent by the micro controller unit 40 includes both a first index value and a second index value of the image to be displayed. The preset mapping relationship stored in the storage medium 20 includes a corresponding relationship between the first index value of the image to be displayed and the original image, and a corresponding relationship between the second index value of the image to be displayed and the color rendering parameter.

The micro controller unit 40 sends the instruction for obtaining the image to be displayed to the integrated circuit IC in the timing controller 10 through the SPI communication protocol or the I2C protocol. The integrated circuit IC receives the instruction, searches and obtains an original image corresponding to the first index value from the preset mapping relationship in the storage medium 20 according to the first index value included in the instruction, and searches and obtains a color rendering parameter corresponding to the second index value from the preset mapping relationship in the storage medium 20 according to the second index value included in the instruction.

The obtained original image and color rendering parameter are temporarily stored in the RAM in the integrated circuit IC. The image processing unit 11 renders the original image data with the low bit number of color depth into the image to be displayed with the high bit number of color depth according to the color rendering parameter to perform color conversion, and then transmits the image to be displayed to the display screen 30, so as to display the image to be displayed on the display screen 30.

In another exemplary operation process, the instruction for obtaining the image to be displayed sent by the micro controller unit 40 further includes a size adjustment parameter of the image to be displayed.

The micro controller unit 40 sends the instruction for obtaining the image to be displayed to the integrated circuit IC in the timing controller 10 through the SPI communication protocol or the I2C protocol. The integrated circuit IC receives the instruction, changes the size of the original image, according to the size adjustment parameter included in the instruction, using the image processing unit 11 to obtain the image to be displayed, and then transmits the image to be displayed to the display screen 30, so as to display the image to be displayed on the display screen 30.

Figure 16:
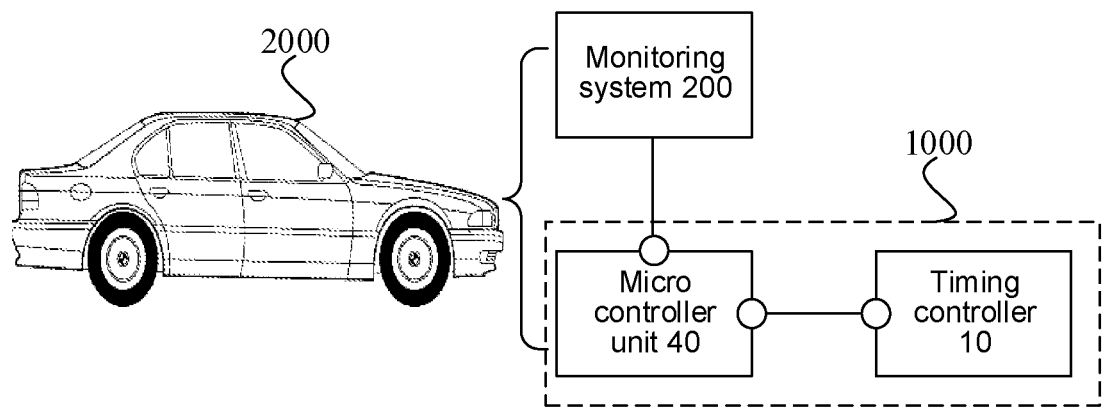
FIG. 16 is a structural diagram of a vehicle, in accordance with some embodiments of the present disclosure.

In addition, in some embodiments, as shown in FIG. 16, a vehicle 2000 is provided, and the vehicle 2000 includes the display device 1000 according to any of the above embodiments.

The display device 1000 included in the vehicle 2000 has the same structure and beneficial effects as the display device 1000 in some of the above embodiments, and details are not described here again.

In some embodiments, as shown in FIG. 16, the vehicle 2000 includes a monitoring system 200. The monitoring system 200 is configured to obtain monitoring information of the vehicle 2000. The monitoring information corresponds to the image to be displayed. The display device 1000 includes a micro controller unit 40 and a timing controller 10 that are coupled to each other. The micro controller unit 40 is also coupled to the monitoring system 200. The micro controller unit 40 is configured to generate an instruction for obtaining an image to be displayed according to the monitoring information of the vehicle 2000, and transmit the instruction to the timing controller 10.

In some examples, the monitoring information includes a plurality of types of vehicle condition information mentioned in some embodiments described above, and the image to be displayed includes icons respectively corresponding to the plurality of types of vehicle condition information.

For the description of the vehicle condition information and the relationship between the vehicle condition information and both the original image and the color rendering parameter that correspond to the image to be displayed, reference may be made to the description in the foregoing embodiments, and details are not described here again.

The foregoing descriptions are merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. An image display method, comprising:
    obtaining both an original image and a color rendering parameter corresponding to an image to be displayed, a bit number of color depth of the original image being smaller than a bit number of color depth of the image to be displayed;
    generating the image to be displayed according to the original image and the color rendering parameter; and
    displaying the image to be displayed;
    wherein obtaining both the original image and the color rendering parameter corresponding to the image to be displayed, includes:
    obtaining both a first index value and a second index value of the image to be displayed;

searching and obtaining the original image from a preset mapping relationship according to the first index value of the image to be displayed; and searching and obtaining the color rendering parameter from the preset mapping relationship according to the second index value of the image to be displayed, wherein the preset mapping relationship includes a corresponding relationship between the first index value of the image to be displayed and the original image, and a corresponding relationship between the second index value of the image to be displayed and the color rendering parameter.

2. The image display method according to claim 1, wherein the original image includes a background portion and an icon portion, a color of the background portion is a first color, and a color of the icon portion is a second color;

generating the image to be displayed according to the original image and the color rendering parameter, includes:

adjusting the color of the icon portion in the original image from the second color to a third color according to the color rendering parameter, so as to obtain the image to be displayed.

3. The image display method according to claim 1, wherein the bit number of color depth of the image to be displayed is 24 bits, and the bit number of color depth of the original image is 1 bit.

4. The image display method according to claim 1, further comprising:

obtaining a size adjustment parameter of the image to be displayed; and generating the image to be displayed according to the original image and the color rendering parameter, includes:

generating the image to be displayed according to the original image, the color rendering parameter, and the size adjustment parameter.

5. The image display method according to claim 4, wherein the size adjustment parameter includes a size magnification factor; and generating the image to be displayed according to the original image, the color rendering parameter, and the size adjustment parameter, includes:

enlarging the original image according to the size magnification factor, so as to obtain an enlarged original image; and performing color rendering processing on the enlarged original image according to the color rendering parameter, so as to obtain the image to be displayed.

6. A display device used to realize the image display method according to claim 1, the display device comprising: a timing controller, a storage medium and a display screen that are coupled to the timing controller, and a micro controller unit coupled to the timing controller, wherein the storage medium is configured to store the original image and the color rendering parameter;

the timing controller is configured to obtain both the original image and the color rendering parameter corresponding to the image to be displayed from the storage medium, and generate data of the image to be displayed according to the original image and the color rendering parameter; and the display screen is configured to display the image to be displayed according to the data of the image to be displayed generated by the timing controller;

the micro controller unit is configured to send an instruction for obtaining the image to be displayed to the timing controller, the instruction including both a first index value and a second index value of the image to be displayed;

the storage medium stores a preset mapping relationship therein, the preset mapping relationship including a corresponding relationship between the first index value of the image to be displayed and the original image, and a corresponding relationship between the second index value of the image to be displayed and the color rendering parameter; and the timing controller is further configured to obtain both the first index value and the second index value of the image to be displayed: search and obtain the original image from the preset mapping relationship in the storage medium according to the first index value of the image to be displayed; and search and obtain the color rendering parameter from the preset mapping relationship in the storage medium according to the second index value of the image to be displayed, wherein the bit number of color depth of the original image is smaller than the bit number of color depth of the image to be displayed.

7. The display device according to claim 6, wherein the instruction further includes a size adjustment parameter; and the timing controller is further configured to generate the image to be displayed according to the original image, the color rendering parameter, and the size adjustment parameter.

8. The display device according to claim 6, wherein the timing controller includes an integrated circuit; the integrated circuit is coupled to the storage medium, and the integrated circuit is configured to store the original image and the color rendering parameter that are obtained from the storage medium.

9. The display device according to claim 8, wherein the original image includes a background portion and an icon portion, a color of the background portion is a first color, and a color of the icon portion is a second color;

the timing controller further includes an image processing unit coupled to the integrated circuit; and the image processing unit is configured to adjust a color of the icon portion of the original image stored in the integrated circuit from the second color to a third color according to the color rendering parameter stored in the integrated circuit, so as to obtain the image to be displayed.

10. The display device according to claim 8, further comprising a source driver, wherein the source driver is coupled to the timing controller and coupled to the display screen; and the source driver is configured to receive the data of the image to be displayed generated by the timing controller, generate a driving signal according to the data of the image to be displayed, and drive the display screen to display the image to be displayed.

11. The display device according to claim 9, wherein communication protocol between the timing controller and the micro controller unit includes a serial peripheral interface (SPI) communication protocol or an inter-integrated circuit (I2C) protocol; and communication protocol between the integrated circuit and the storage medium includes the SPI communication protocol or the I2C protocol.

12. A vehicle comprising the display device according to claim 6.

13. The vehicle according to claim 12, further comprising a monitoring system, wherein the monitoring system is configured to obtain monitoring information of the vehicle, and the monitoring information corresponds to the image to be displayed;

the display device includes a micro controller unit and a timing controller that are coupled to each other; and the micro controller unit is further coupled to the monitoring system; the micro controller unit is configured to generate an instruction for obtaining the image to be displayed according to the monitoring information of the vehicle, and transmit the instruction to the timing controller.

14. The image display method according to claim 4, wherein the size adjustment parameter includes a size magnification factor; and generating the image to be displayed according to the original image, the color rendering parameter, and the size adjustment parameter, includes:

performing color rendering processing on the original image according to the color rendering parameter, so as to obtain a color-rendered original image; and enlarging the color-rendered original image according to the size magnification factor, so as to obtain the image to be displayed.

\* \* \* \* \*